(12) United States Patent
Wu et al.

(10) Patent No.: US 9,532,244 B2
(45) Date of Patent: Dec. 27, 2016

(54) INTERFERENCE CANCELLATION METHOD, DATA SENDING METHOD, AND APPARATUSES IN LONG TERM EVOLUTION SYSTEM

(71) Applicant: Huawei Technologies Co., Ltd., Shenzhen, Guangdong (CN)

(72) Inventors: Tong Wu, Shenzhen (CN); Dengkun Xiao, Beijing (CN); Jingxin Wei, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 98 days.

(21) Appl. No.: 14/553,349

(22) Filed: Nov. 25, 2014

(65) Prior Publication Data

US 2015/0078257 A1 Mar. 19, 2015

Related U.S. Application Data

(63) Continuation of application No. PCT/CN2012/077041, filed on Jun. 15, 2012.

(30) Foreign Application Priority Data

May 25, 2012 (CN) .......................... 2012 1 0166814

(51) Int. Cl.
*H04W 4/00* (2009.01)
*H04W 24/02* (2009.01)
(Continued)

(52) U.S. Cl.
CPC ............ *H04W 24/02* (2013.01); *H04L 5/0048* (2013.01); *H04L 25/0202* (2013.01); *H04L 25/0224* (2013.01)

(58) Field of Classification Search
None
See application file for complete search history.

(56) References Cited

U.S. PATENT DOCUMENTS 9,264,097 B2 * 2/2016 Gorokhov ............ H04B 1/7103
370/328
2010/0009634 A1 1/2010 Budianu et al.
(Continued)

FOREIGN PATENT DOCUMENTS

CN  101827053 A  9/2010
CN  102065031 A  5/2011
(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.5.0, Mar. 2012, 302 pages.
(Continued)

*Primary Examiner* — Ahn-Vu Ly

(57) ABSTRACT

An interference cancellation method, data sending method, apparatus, user equipment and base station in a Long Term Evolution system are disclosed. The interference cancellation method includes: obtaining downlink cell-specific power ratio information of a specific cell; performing channel estimation based on a downlink cell-specific reference signal (CRS) of the specific cell, to obtain a channel estimation matrix of a specific physical channel, signal, or message of the specific cell; compensating the channel estimation matrix by using the downlink cell-specific power ratio information; and canceling, in an original signal that is received from a target cell and is interfered by the specific cell, interference caused by the specific cell in a received signal from a specific physical channel, signal, or message. A technical problem in the prior art that a user equipment (Continued)

cannot effectively cancel interference because power transmission strength of a strong interfering cell cannot be correctly estimated is solved.

20 Claims, 9 Drawing Sheets

(51) Int. Cl.
*H04L 25/02* (2006.01)
*H04L 5/00* (2006.01)

(56) References Cited

U.S. PATENT DOCUMENTS

| | | | |
|---|---|---|---|
| 2010/0069010 A1 | 3/2010 | Karakayali et al. | |
| 2010/0103867 A1* | 4/2010 | Kishiyama | H04W 52/04 370/320 |
| 2010/0309861 A1 | 12/2010 | Gorokhov et al. | |
| 2011/0176518 A1* | 7/2011 | Bjorkegren | H04B 1/7107 370/335 |
| 2011/0312358 A1* | 12/2011 | Barbieri | H04W 24/10 455/507 |
| 2012/0201152 A1* | 8/2012 | Yoo | H04B 17/345 370/252 |
| 2012/0327795 A1* | 12/2012 | Mallik | H04B 17/345 370/252 |
| 2013/0107823 A1* | 5/2013 | Damnjanovic | H04W 52/16 370/329 |
| 2013/0229971 A1* | 9/2013 | Siomina | H04W 24/10 370/312 |
| 2013/0301451 A1* | 11/2013 | Siomina | H04W 24/00 370/252 |
| 2013/0344909 A1* | 12/2013 | Davydov | H04B 7/0689 455/501 |
| 2015/0110024 A1* | 4/2015 | Manssour | H04W 72/1273 370/329 |

FOREIGN PATENT DOCUMENTS

| | | |
|---|---|---|
| CN | 102160345 A | 8/2011 |
| CN | 102449920 A | 5/2012 |
| WO | WO 2011/088465 A1 | 7/2011 |

OTHER PUBLICATIONS

"3rd Generation Partnership Project; Technical Specification Group Radio Access Network; Evolved Universal Terrestrial Radio Access Network (E-UTRAN); X2 application protocol (X2AP) (Release 11)", 3GPP TS 36.423 V11.0.0, Mar. 2012, 134 pages.

"3rd Generation Partnership Project; Technical Specification Group Radio Access Network; Evolved Universal Terrestrial Radio Access (E-UTRA); Physical layer procedures (Release 10)", 3GPP TS 36.213 V10.5.0, Mar. 2012, 125 pages.

Ming Huang et al., "Macro-Femto Inter-Cell Interference Mitigation for 3GPP LTE-A Downlink", WCNC 2012 Workshop on Broadband Femtocell Technologies, p. 75-80.

"Remaining details for ca based HetNet in Rel-10", Ericsson, ST-Ericsson, 3GPP TSG-RAN WG1 #65, May 9-13, 2011, 3 pages, R1-111323.

\* cited by examiner

CONT. FROM
FIG. 8A

CONT. FROM
FIG. 8A

CONT. FROM
FIG. 8A

806. The user terminal cancels, in a received original signal S, the received signal S1i from the specific physical channel, signal, or message of the strong intra-frequency neighboring cell 1, that is, the user terminal completes cancellation of interference from the specific physical channel, signal, or message of the strong intra-frequency neighboring cell 1

807. The user terminal then performs channel estimation for the strong interfering cell based on a downlink cell-specific reference signal CRS of the strong intra-frequency neighboring cell 2 (the base station 2), and obtains a channel estimation matrix H2 of the specific physical channel, signal, or message 808. Based on the channel estimation matrix H2, the user terminal demodulates the specific physical channel, signal, or message of the strong intra-frequency neighboring cell 2, and then performs step 809 after demodulation 809. The user terminal compensates the original channel estimation matrix H1 of the specific physical channel, signal, or message based on the power difference factor in the broadcast message SIB2 of the strong intra-frequency neighboring cell 2, to obtain a new channel estimation matrix H2', and reconstructs a received signal S2i of the specific physical channel, signal, or message of the intra-frequency neighboring cell (the base station 2) in combination with a decoding result of the specific physical channel, signal, or message 810. The user terminal cancels, in a received signal S' in which strong interference from the intra-frequency neighboring cell 1 is already canceled, the received signal S2i from the specific physical channel, signal, or message of the strong intra-frequency neighboring cell 2, so as to complete multi-cell serial interference cancellation on the specific physical channels, signals, or messages of the strong intra-frequency neighboring cell 1 and the strong intra-frequency neighboring cell 2

FIG. 8B

INTERFERENCE CANCELLATION METHOD, DATA SENDING METHOD, AND APPARATUSES IN LONG TERM EVOLUTION SYSTEM

CROSS-REFERENCE TO RELATED APPLICATIONS

This application is a continuation of International Application No. PCT/CN2012/077041, filed on Jun. 15, 2012, which claims priority to Chinese Patent Application No. 201210166814.3, filed on May 25, 2012, both of which are hereby incorporated by reference in their entireties.

TECHNICAL FIELD

The present invention relates to the field of communications technologies, and in particular, to an interference cancellation method, a data sending method, apparatuses, a user equipment, and a base station in a Long Term Evolution system.

BACKGROUND

With the development of mobile communications, a traditional macro cellular network cannot satisfy an increasing requirement of a user service rate any more. Therefore, in order to increase a data transmission rate and prevent occurrence of a coverage hole, a growing number of low power nodes (LPNs, low power nodes) will be deployed in a wireless network, so as to ensure quality of service (QoS, quality of service) for users and improve network performance.

A main purpose of deploying the LPNs is to cover a hotspot, that is, to enable more users to find some low power nodes in a surrounding environment as soon as possible and access or camp on the low power nodes as soon as possible, thereby implementing proper use of network resources and load balance. Because of a network deployment requirement of an operator, a large cell range extension (CRE, Cell Range extension) factor is introduced for LPNs, so that users can identify the LPNs as soon as possible to access or camp on the LPNs. However, such a solution also causes serious network interference, especially interference of a micro base station with edge users within coverage of the LPNs.

At present, the foregoing interference is generally canceled in the following two modes:

First interference cancellation mode: An inter-cell interference cancellation (ICIC, Inter-cell Interference Cancellation) manner or an inter-cell interference cancellation (eICIC, Enhanced Inter-cell Interference Cancellation) manner is used on a network side to assist in reducing interference with a user terminal. For example, an almost blank subframe (ABS, Almost Blank Subframes) policy is used in the eICIC solution. However, assistance in reducing interference with a user terminal on the network side is applicable only to small CRE (less than or equal to 6 dB) and is not applicable to CRE greater than 6 dB.

Second interference cancellation mode: An interference cancellation (IC, Interference Cancellation) algorithm is used on a user terminal side to directly cancel interference. That is, an original signal is recovered by estimating a signal of a strongest interfering cell and then subtracting, on a receiving terminal, the estimated interfering signal from a received signal that includes interference. However, an interference cancellation effect on the user terminal side entirely depends on accuracy of estimation of a signal of an interfering cell.

However, in research on and practice of the prior art, the inventor of the present invention finds that in an existing implementation manner, when a user terminal performs interference cancellation, specific physical channels, signals, or messages such as a PCFICH, a PDCCH, a PBCH, a PCH, an SIB message, a PSS, or an SSS of a specific cell (including a serving cell or an intra-frequency neighboring cell) cause main interference received by the user terminal, but the user terminal does not know exactly power transmission strength of these specific physical channels, signals, or messages of the interfering cell; therefore, a user can only blindly estimate these specific physical channels, signals, or messages of the strong interfering cell, resulting in large deviation during estimation and reconstruction of an interfering signal and seriously affecting interference cancellation performance of a user equipment.

SUMMARY

Embodiments of the present invention provide an interference cancellation method, a data sending method, apparatuses, a user equipment, and a base station in a Long Term Evolution system, so as to solve a technical problem in the prior art that a user equipment cannot effectively cancel interference because power transmission strength of a strong interfering cell cannot be correctly estimated.

In order to solve the foregoing problem, an embodiment of the present invention provides an interference cancellation method in a Long Term Evolution system, including:

obtaining downlink cell-specific power ratio information of an intra-frequency neighboring cell;

performing channel estimation of an interfering cell for a downlink cell-specific reference signal CRS of the intra-frequency neighboring cell, to obtain a channel estimation matrix of a specific physical channel, signal, or message of the interfering cell;

compensating the channel estimation matrix by using the downlink cell-specific power ratio information, to obtain a new channel estimation matrix;

reconstructing a received signal from a specific physical channel, signal, or message of the intra-frequency neighboring cell according to the new channel estimation matrix; and canceling, in a received original signal, interference caused by the interfering cell in a received signal from a specific physical channel, signal, or message.

An embodiment of the present invention further provides a data sending method in a Long Term Evolution system, including:

adding downlink cell-specific power ratio information to a broadcast message; and broadcasting the broadcast message to a user equipment, so that the user equipment that receives the broadcast message performs interference cancellation.

An embodiment of the present invention further provides an interference cancellation apparatus in a Long Term Evolution system, including:

an obtaining unit, configured to obtain downlink cell-specific power ratio information of an intra-frequency neighboring cell;

an estimating unit, configured to perform channel estimation of an interfering cell for a downlink cell-specific reference signal CRS of the intra-frequency neighboring cell, to obtain a channel estimation matrix of a specific physical channel, signal, or message of the interfering cell;

a compensating unit, configured to compensate the channel estimation matrix by using the downlink cell-specific power ratio information, to obtain a new channel estimation matrix;

a reconstructing unit, configured to reconstruct a received signal from a specific physical channel, signal, or message of the intra-frequency neighboring cell according to the new channel estimation matrix; and an interference cancellation unit, configured to cancel, in a received original signal, interference caused by the interfering cell in a received signal from a specific physical channel, signal, or message.

An embodiment of the present invention further provides a data sending apparatus in a Long Term Evolution system, including:

an adding unit, configured to add downlink cell-specific power ratio information to a broadcast message; and a broadcast unit, configured to broadcast the broadcast message to a user equipment, so that the user equipment that receives the broadcast message performs interference cancellation.

An embodiment of the present invention further provides a user equipment, including the foregoing interference cancellation apparatus in the Long Term Evolution system.

An embodiment of the present invention further provides a base station, including the foregoing data sending apparatus in the Long Term Evolution system.

An embodiment of the present invention further provides an interference cancellation method in a Long Term Evolution system. The method includes:

obtaining downlink cell-specific power ratio information of a specific cell, where the specific cell includes a neighboring cell or a serving cell;

performing channel estimation based on a downlink cell-specific reference signal CRS of the specific cell, to obtain a channel estimation matrix of a specific physical channel, signal, or message of the specific cell;

compensating the channel estimation matrix by using the downlink cell-specific power ratio information of the specific cell, to obtain a new channel estimation matrix;

reconstructing a received signal from the specific physical channel, signal, or message of the specific cell according to the new channel estimation matrix; and canceling, in an original signal received from a target cell, interference caused by the intra-frequency specific cell, which is not the target cell, in a received signal from a specific physical channel, signal, or message, where the target cell includes a serving cell or a neighboring cell.

An embodiment of the present invention further provides a data sending method in a Long Term Evolution system. The method includes:

obtaining downlink cell-specific power ratio information of a specific cell, or obtaining downlink cell-specific power ratio information and a physical cell identifier of a specific cell;

adding the downlink cell-specific power ratio information of the specific cell, or the downlink cell-specific power ratio information of the specific cell and the physical cell identifier of the specific cell to a radio resource control RRC message, or adding the downlink cell-specific power ratio information of the specific cell to a broadcast message, where the specific cell includes a neighboring cell or a serving cell; and unicasting the RRC message or broadcasting the broadcast message to a user terminal, so that the user terminal that receives the RRC message or the broadcast message performs interference cancellation.

An embodiment of the present invention further provides an interference cancellation apparatus in a Long Term Evolution system, including:

an obtaining unit, configured to obtain downlink cell-specific power ratio information of a specific cell, where the specific cell includes a neighboring cell or a serving cell;

an estimating unit, configured to perform channel estimation based on a downlink cell-specific reference signal CRS of the specific cell, to obtain a channel estimation matrix of a specific physical channel, signal, or message of the specific cell;

a compensating unit, configured to compensate the channel estimation matrix by using the downlink cell-specific power ratio information of the specific cell, to obtain a new channel estimation matrix;

a reconstructing unit, configured to reconstruct a received signal from the specific physical channel, signal, or message of the specific cell according to the new channel estimation matrix; and an interference cancellation unit, configured to cancel, in an original signal received from a target cell, interference caused by the intra-frequency specific cell, which is not the target cell, in a received signal from a specific physical channel, signal, or message, where the target cell includes a serving cell or a neighboring cell, where the target cell includes a serving cell or a neighboring cell.

An embodiment of the present invention further provides a data sending apparatus in a Long Term Evolution system, including:

an obtaining unit, configured to obtain downlink cell-specific power ratio information of a specific cell, or obtain downlink cell-specific power ratio information and a physical cell identifier of a specific cell;

an adding unit, configured to add the downlink cell-specific power ratio information of the specific cell, or the downlink cell-specific power ratio information of the specific cell and the physical cell identifier of the specific cell to a radio resource control RRC message, or add the downlink cell-specific power ratio information of the specific cell to a broadcast message; and a broadcast unit, configured to unicast the RRC message or broadcast the broadcast message to a user terminal, so that the user terminal that receives the RRC message or the broadcast message performs interference cancellation.

An embodiment of the present invention further provides a user equipment, where the user equipment includes the foregoing interference cancellation apparatus in the Long Term Evolution system, and the interference cancellation apparatus in the Long Term Evolution system is described above.

An embodiment of the present invention further provides a base station, where the base station includes a data sending apparatus in a Long Term Evolution system, and the data sending apparatus in the Long Term Evolution system is described above.

As can be known from the foregoing technical solutions, in the embodiments of the present invention, a power difference factor or a power ratio factor between a specific physical channel, signal, or message and a reference signal CRS is broadcast in a broadcast message, so that an edge user equipment subject to strong interference can effectively estimate a strong interfering signal and effectively cancel the strong interference according to an interference cancellation algorithm designed in the embodiments of the present invention, thereby improving interference cancellation performance of a user terminal.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 8A and FIG. 8B are a diagram of a signaling process of an interference cancellation method in the application scenario shown in FIG. 7.

DETAILED DESCRIPTION

Figure 1:
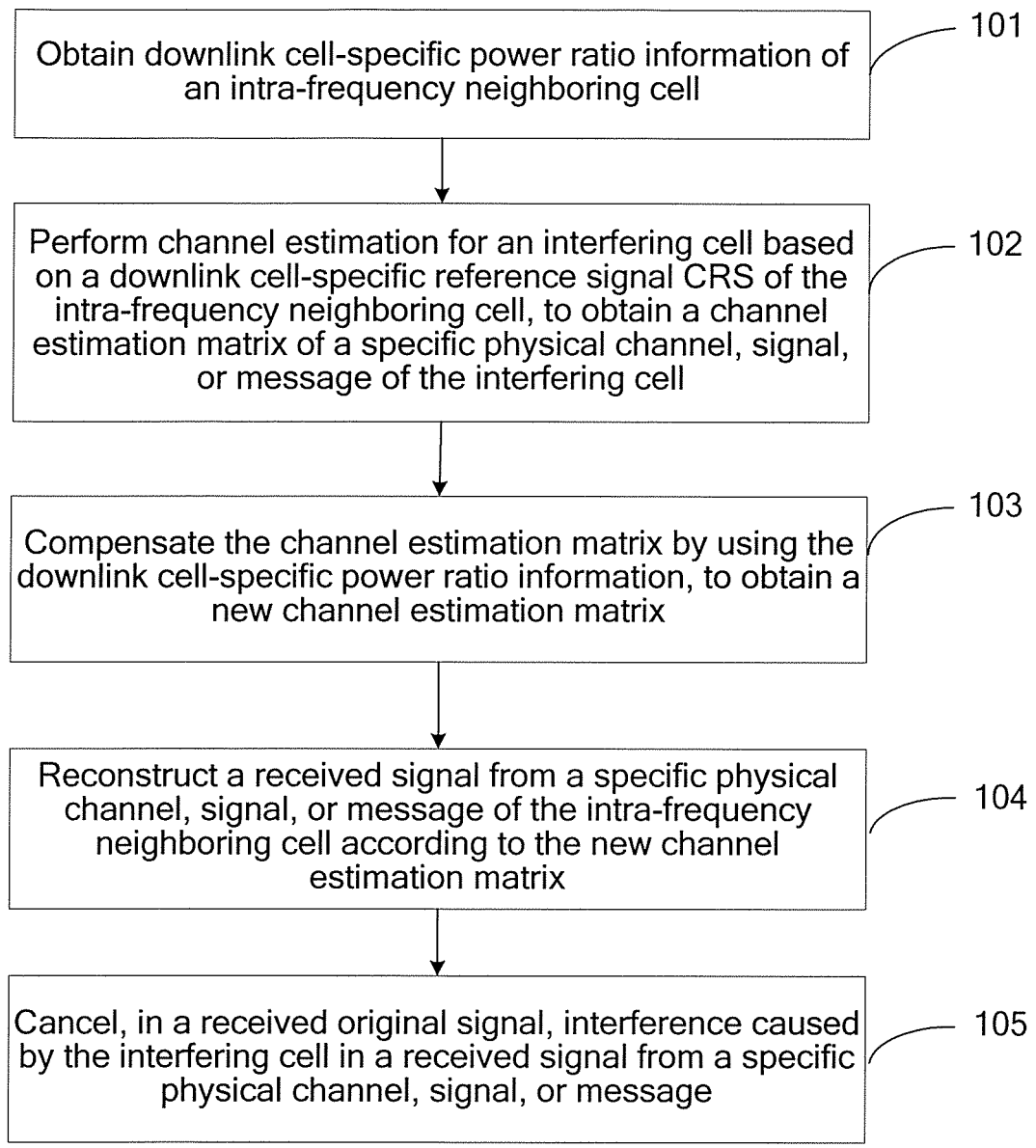
FIG. 1 is a flowchart of an interference cancellation method in a Long Term Evolution system according to an embodiment of the present invention.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In the embodiments of the present invention, a UE may be any one of the following types, and may be static or mobile. Static UEs may specifically include a terminal (terminal), a mobile station (mobile station), a subscriber unit (subscriber unit), a station (station), and the like. Mobile UEs may specifically include a cellular phone (cellular phone), a personal digital assistant (PDA, personal digital assistant), a wireless modem (modem), a wireless communications device, a handheld (handheld) device, a laptop computer (laptop computer), a cordless phone (cordless phone), a wireless local loop (WLL, wireless local loop) station, and the like. The foregoing UEs may be distributed in an entire wireless network.

To help understand the present invention, the following terms are first introduced.

Serving cell: a cell providing business and service for a user terminal. The user terminal in an idle state or a connected state receives a paging or SIB1 broadcast message from the serving cell.

Intra-frequency neighboring cell: a cell except a serving cell in a network and using a same frequency as that of the serving cell is called an intra-frequency neighboring cell. Generally, intra-frequency neighboring cells mainly refer to a circle of surrounding neighboring intra-frequency cells closest to a serving cell.

Neighboring cell: a cell except a serving cell in a network. Generally, neighboring cells mainly refer to a circle of cells closest to a serving cell. According to the definition, an intra-frequency neighboring cell is a subset of a neighboring cell.

Target cell: For a user terminal, the user terminal measures various RRM parameters of a node that the user terminal can detect in a network, and the measured cell is referred to as a "target cell". According to the definition of a target cell, a target cell may be a serving cell, or may be a neighboring cell.

Specific cell: In the present invention, a specific cell refers to a cell that causes intra-frequency interference in a target cell. Therefore, a certain correspondence exists between the specific cell and the target cell. For a user terminal, if an object that needs to be measured is a serving cell, that is, when a target cell is a serving cell, a specific cell is certainly an intra-frequency neighboring cell; if an object that needs to be measured is a neighboring cell, that is, when a target cell is a neighboring cell, a specific cell may be a serving cell, or may be another neighboring cell different from the target cell.

Based on an understanding of the foregoing terms, refer to FIG. 1. FIG. 1 is a flowchart of an interference cancellation method in a Long Term Evolution system according to an embodiment of the present invention. The method includes:

Step 101: Obtain downlink cell-specific power ratio information of an intra-frequency neighboring cell.

In this embodiment, the downlink cell-specific power ratio information may include: a power ratio factor or a power difference factor between transmit power of a specific physical channel, signal, or message and transmit power of a reference signal CRS; or a power ratio factor or a power difference factor between transmit power of a reference signal CRS and transmit power of a specific physical channel, signal, or message. However, the present invention is not limited thereto, and the downlink cell-specific power ratio information may further be other similar parameters.

The specific physical channel includes a physical control format indicator channel PCFICH, a physical downlink control channel PDCCH, a physical broadcast channel PBCH, or a paging channel PCH; the specific message includes a system information block SIB message; and the specific signal includes a primary synchronization signal PSS or a secondary synchronization signal SSS.

A manner for obtaining the downlink cell-specific power ratio information of the intra-frequency neighboring cell may include: receiving, by a user equipment, the downlink cell-specific power ratio information of the intra-frequency neighboring cell, which is broadcast on a network side by using a physical broadcast channel PBCH; or receiving, by a user equipment, a system information block SIB message broadcast on a network side, where the system information block SIB message includes the downlink cell-specific power ratio information of the intra-frequency neighboring cell.

Step 102: Perform channel estimation of an interfering cell for a downlink cell-specific reference signal CRS of the intra-frequency neighboring cell, to obtain a channel estimation matrix of a specific physical channel, signal, or message of the interfering cell.

A process of the channel estimation is a technology well known to a person skilled in the art, and therefore is not described herein.

Step 103: Compensate the channel estimation matrix by using the downlink cell-specific power ratio information, to obtain a new channel estimation matrix.

For details about a specific compensating process, refer to a subsequent embodiment, and the details are not described herein.

Step 104: Reconstruct a received signal from a specific physical channel, signal, or message of the intra-frequency neighboring cell according to the new channel estimation matrix.

Step 105: Cancel, in a received original signal, a received signal from a specific physical channel, signal, or message, so as to implement interference cancellation on the specific physical channel, signal, or message.

In the embodiment of the present invention, a user terminal obtains sending power of a specific physical channel, signal, or message of an interfering cell by obtaining downlink cell-specific power ratio information, so that in a case in which large CRE is introduced, a user equipment can better estimate a strong interfering signal of the interfering cell and implement interference cancellation on the specific physical channel, signal, or message of the interfering cell, thereby further improving performance of an interference cancellation algorithm, ensuring QoS of an edge user in a HetNet scenario, and improving network performance.

Figure 1A:
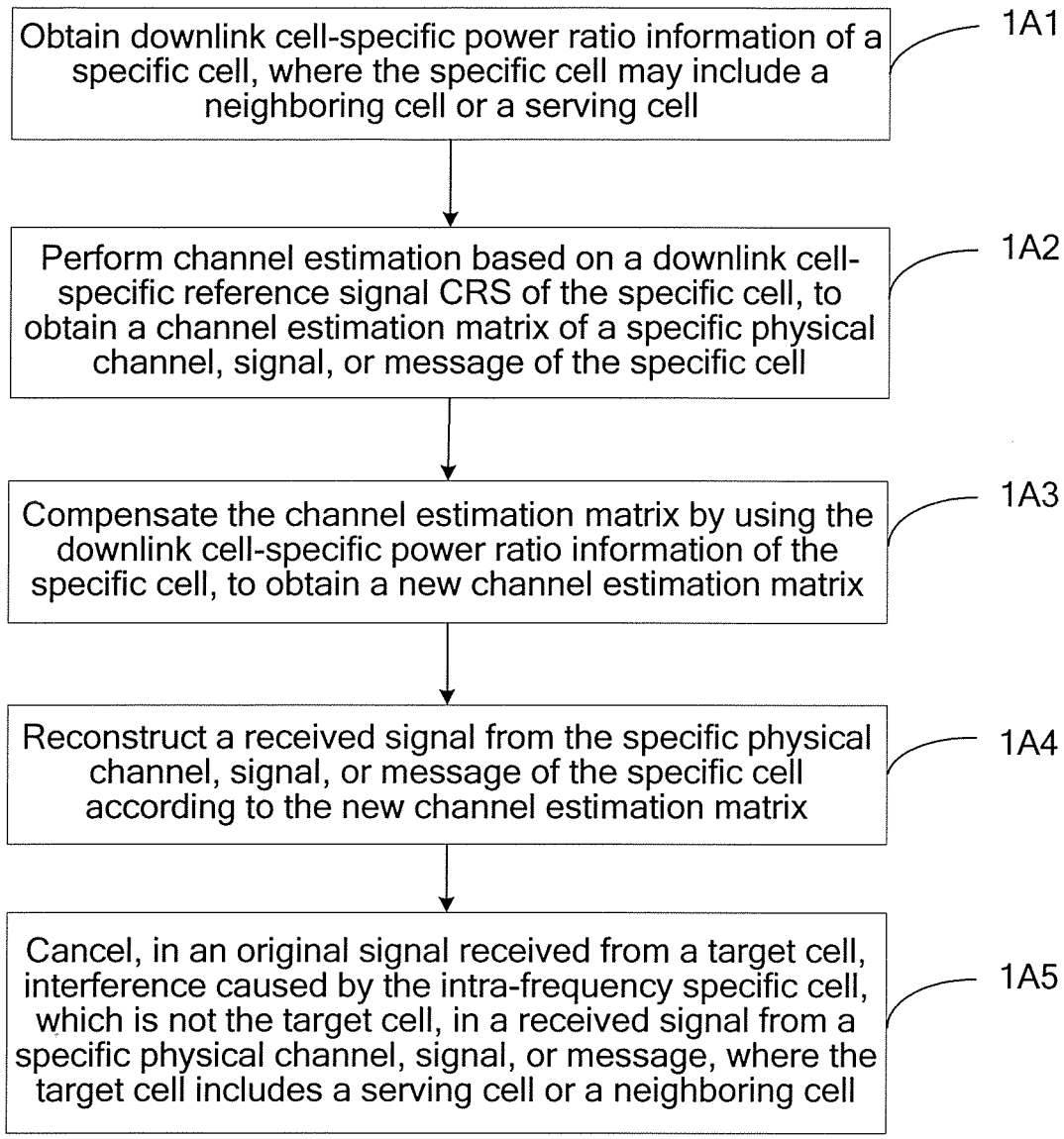
FIG. 1A is a flowchart of another interference cancellation method in a Long Term Evolution system according to an embodiment of the present invention.

Further refer to FIG. 1A, which is a flowchart of an interference cancellation method in a Long Term Evolution system according to an embodiment of the present invention. The method includes:

Step 1A1: Obtain downlink cell-specific power ratio information of a specific cell, where the specific cell may include a neighboring cell or a serving cell.

The obtaining downlink cell-specific power ratio information of a specific cell may specifically include: receiving, by a user equipment, the downlink cell-specific power ratio information of the specific cell, which is unicast on a network side by using an RRC message; or receiving, by a user equipment, the downlink cell-specific power ratio information of the specific cell and a physical cell identifier of the specific cell, which are unicast by on network side by using an RRC message; or receiving, by a user equipment, the downlink cell-specific power ratio information of the specific cell, or the downlink cell-specific power ratio information of the specific cell and a physical cell identifier of the specific cell, broadcast on a network side by using a physical broadcast channel PBCH; or receiving a system information block SIB message broadcast on a network side, where the system information block SIB message includes the downlink cell-specific power ratio information of the specific cell, or the downlink cell-specific power ratio information of the specific cell and a physical cell identifier of the specific cell.

For details about specific content of the downlink cell-specific power ratio information, refer to the foregoing description, which is not described herein again.

Step 1A2: Perform channel estimation based on a downlink cell-specific reference signal CRS of the specific cell, to obtain a channel estimation matrix of a specific physical channel, signal, or message of the specific cell.

Step 1A3: Compensate the channel estimation matrix by using the downlink cell-specific power ratio information of the specific cell, to obtain a new channel estimation matrix.

Step 1A4: Reconstruct a received signal from the specific physical channel, signal, or message of the specific cell according to the new channel estimation matrix.

Step 1A5: Cancel, in an original signal received from a target cell, interference caused by the intra-frequency specific cell, which is not the target cell, in a received signal from a specific physical channel, signal, or message, where the target cell includes a serving cell or a neighboring cell.

In this embodiment, when the target cell is a serving cell, the specific cell is a neighboring cell; when the target cell is a neighboring cell, the specific cell may be a serving cell, or may be another neighboring cell different from the target cell.

Implementation processes in this embodiment is similar to those of the foregoing embodiment shown in FIG. 1. A difference lies in that this embodiment involves a specific cell such as a neighboring cell or a serving cell while the embodiment in FIG. 1 involves an intra-frequency neighboring cell, and other implementation processes are the same.

Figure 2:
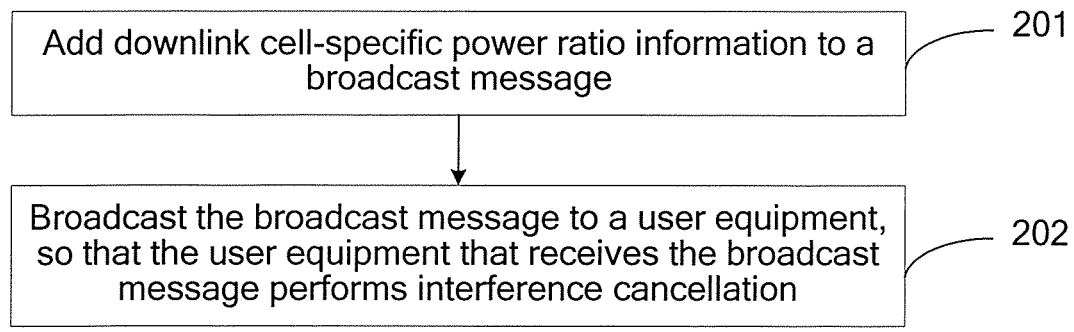
FIG. 2 is a flowchart of a data sending method in a Long Term Evolution system according to an embodiment of the present invention.

Further refer to FIG. 2, which is a flowchart of a data sending method in a Long Term Evolution system according to an embodiment of the present invention. The method includes:

Step 201: Add downlink cell-specific power ratio information to a broadcast message. That is, nodes (including a macro cell and a low power node) on a network side separately add obtained downlink cell-specific power ratio information to a corresponding broadcast message.

In this step, the downlink cell-specific power ratio information includes: a power ratio factor or a power difference factor between transmit power of a specific physical channel, signal, or message and transmit power of a reference signal CRS; or a power ratio factor or a power difference factor between transmit power of a reference signal CRS and transmit power of a specific physical channel, signal, or message.

The specific physical channel includes a physical control format indicator channel PCFICH, a physical downlink control channel PDCCH, a physical broadcast channel PBCH, or a paging channel PCH; the specific message includes a system information block SIB message; and the specific signal includes a primary synchronization signal PSS or a secondary synchronization signal SSS.

Step 202: Broadcast the broadcast message to a user equipment, so that the user equipment that receives the broadcast message performs interference cancellation.

In this step, the broadcast message may be broadcast on the network side (for example, a base station) to nodes (for example, user equipments) by using a physical broadcast channel PBCH; or a system information block SIB message may be broadcast on the network side (for example, a base station) to nodes (for example, user equipments), where the broadcast message is the system information block SIB message, that is, the SIB message includes: the power ratio factor or the power difference factor between the transmit power of the specific physical channel, signal, or message and the transmit power of the reference signal CRS; or the power ratio factor or the power difference factor between the transmit power of the reference signal CRS and the transmit power of the specific physical channel, signal, or message.

In this embodiment, the nodes refer to base stations on the network side, and the node that receives the broadcast message is a UE.

In the embodiment of the present invention, a power difference factor or a power ratio factor between a specific physical channel, signal, or message and a reference signal CRS is broadcast in a broadcast message, so that an edge user equipment subject to strong interference can effectively estimate a strong interfering signal and effectively cancel the strong interference according to an interference cancellation algorithm designed in the embodiment of the present invention, thereby improving interference cancellation performance of a user terminal.

Figure 2A:
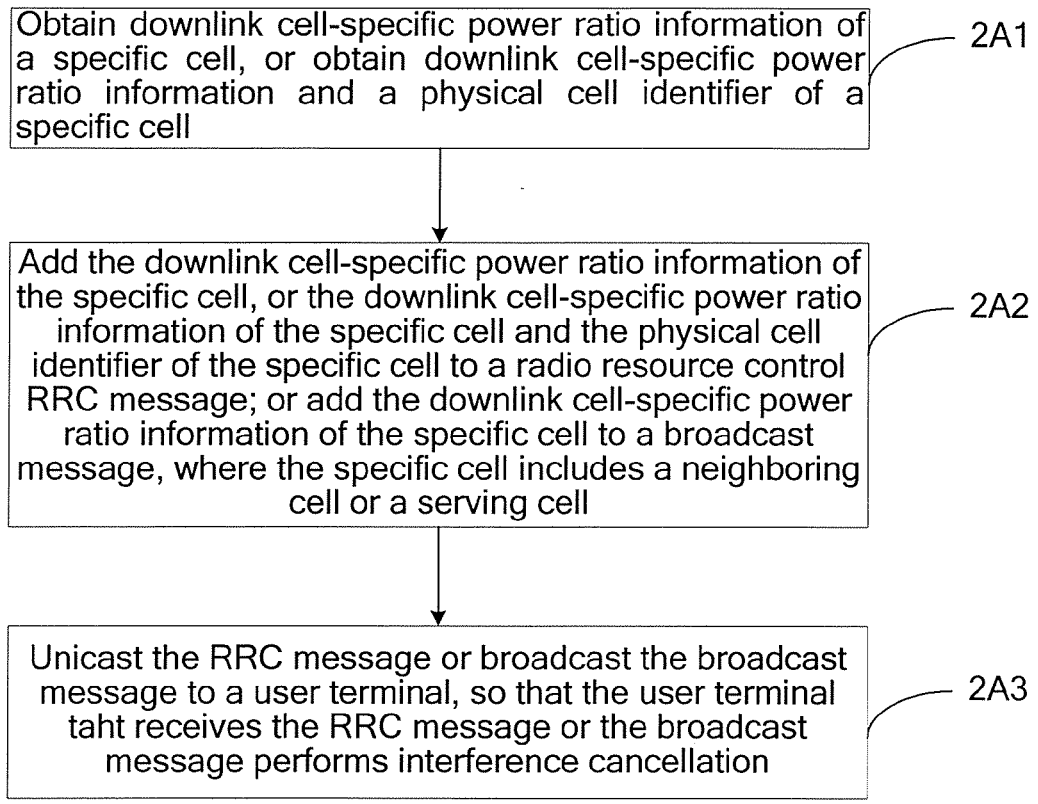
FIG. 2A is a flowchart of another data sending method in a Long Term Evolution system according to an embodiment of the present invention.

Further refer to FIG. 2A, which is a flowchart of another data sending method in a Long Term Evolution system according to an embodiment of the present invention. The method includes:

Step 2A1: Obtain downlink cell-specific power ratio information of a specific cell, or obtain downlink cell-specific power ratio information and a physical cell identifier of a specific cell, where the specific cell includes a neighboring cell or a serving cell.

In this step, a network node (for example, a base station) may obtain the downlink cell-specific power ratio information of the specific cell or obtain the downlink cell-specific power ratio information and the physical cell identifier of the specific cell by using a logical interface to the specific cell or the serving cell; or a base station obtains the downlink cell-specific power ratio information of the specific cell or the downlink cell-specific power ratio information and the physical cell identifier of the specific cell by using load information; or a base station may obtain the downlink cell-specific power ratio information of the specific cell or the downlink cell-specific power ratio information and the physical cell identifier of the specific cell by using load information transmitted by a logical interface. However, the present invention is not limited thereto, and other information may further be used.

Optionally, the obtaining downlink cell-specific power ratio information of a specific cell or obtaining downlink cell-specific power ratio information and a physical cell identifier of a specific cell specifically includes: obtaining, by the specific cell and the serving cell, downlink cell-specific power ratio information of a specific cell of the opposite party of each other or downlink cell-specific power ratio information and a physical cell identifier of a specific cell of each other by using a logical interface between the specific cell and the serving cell.

Certainly, when the specific cell that needs to perform unicast or broadcast is not a serving cell of a user terminal, the specific cell and the serving cell may obtain downlink cell-specific power ratio information of a specific cell of the opposite party or downlink cell-specific power ratio information and a physical cell identifier of a specific cell of each other by using a logical interface between the specific cell and the serving cell.

For example, the downlink cell-specific power ratio information of the specific cell may be transmitted or the downlink cell-specific power ratio information and the physical cell identifier of the specific cell may be obtained by using signaling of the logical interface between the specific cell and the serving cell. That is, the downlink cell-specific power ratio information of the specific cell is transmitted or the downlink cell-specific power ratio information and the physical cell identifier of the specific cell are obtained by using the load information. However, the present invention is not limited thereto.

Step 2A2: Add the downlink cell-specific power ratio information of the specific cell, or the downlink cell-specific power ratio information of the specific cell and the physical cell identifier of the specific cell to a radio resource control RRC message; or add the downlink cell-specific power ratio information of the specific cell to a broadcast message, where the specific cell includes a neighboring cell or a serving cell.

Step 2A3: Unicast the RRC message or broadcast the broadcast message to a user terminal, so that the user terminal that receives the RRC message or the broadcast message performs interference cancellation.

In this step, on a network side (for example, a base station), the RRC message may be unicast or the broadcast message may be broadcast to the user terminal in multiple manners, which are not limited to the following manners:

On the network side, the downlink cell-specific power ratio information of the specific cell may be unicast by using a radio resource control information element in the RRC message;

or the downlink cell-specific power ratio information of the specific cell and the physical cell identifier of the specific cell may be unicast by using a radio resource control information element or a measurement information element in the RRC message;

or the downlink cell-specific power ratio information, or the downlink cell-specific power ratio information and the physical cell identifier of the specific cell may be broadcast to the user terminal by using a system master information block MIB carried on a physical broadcast channel PBCH;

or the downlink cell-specific power ratio information, or the downlink cell-specific power ratio information and the physical cell identifier of the specific cell may be broadcast to the user terminal by using a system information block SIB message, for example, an SIB2.

In this embodiment, for details about specific content of the downlink cell-specific power ratio information, refer to the foregoing description, which is not described herein again.

In the embodiment of the present invention, downlink cell-specific power ratio information, or downlink cell-specific power ratio information of a specific cell and a physical cell identifier of the specific cell are unicast in an RRC message or broadcast in a broadcast message, so that an edge user equipment subject to strong interference effectively estimates a strong interfering signal and effectively cancels the strong interference according to the downlink cell-specific power ratio information, or the downlink cell-specific power ratio information of the specific cell and the physical cell identifier of the specific cell, thereby improving interference cancellation performance of a user terminal.

Figure 3:
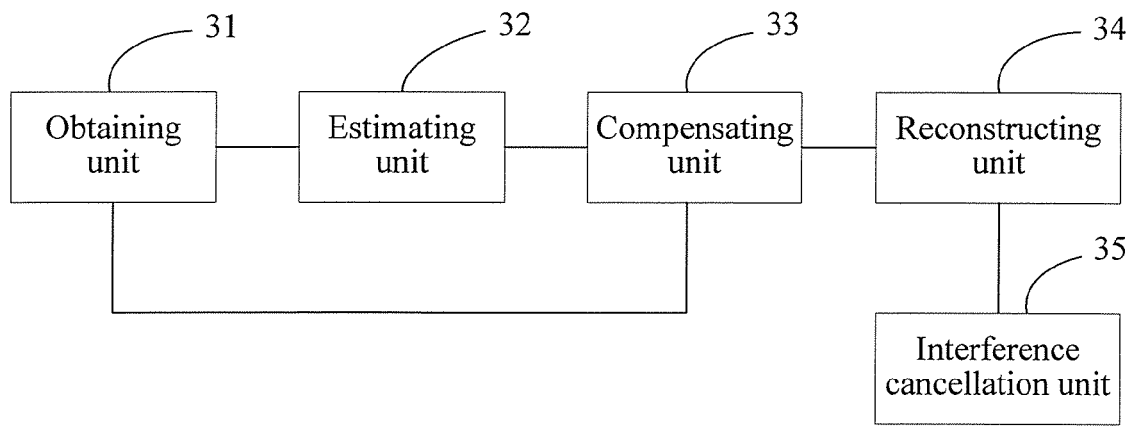
FIG. 3 is a schematic structural diagram of an interference cancellation apparatus in a Long Term Evolution system according to an embodiment of the present invention.

Based on the implementation process of the foregoing method, an embodiment of the present invention further provides an interference cancellation apparatus in a Long Term Evolution system. FIG. 3 shows a schematic structural diagram of the apparatus. The apparatus includes: an obtaining unit 31, an estimating unit 32, a compensating unit 33, a reconstructing unit 34, and an interference cancellation unit 35, where the obtaining unit 31 is configured to obtain downlink cell-specific power ratio information of an intra-frequency neighboring cell, where the downlink cell-specific power ratio information includes: a power ratio factor or a power difference factor between transmit power of a specific physical channel, signal, or message and transmit power of a reference signal CRS, or a power ratio factor or a power difference factor between transmit power of a reference signal CRS and transmit power of a specific physical channel, signal, or message; the estimating unit 32 is configured to perform channel estimation for an interfering cell based on a downlink cell-specific reference signal CRS of the intra-frequency neighboring cell, to obtain a channel estimation matrix of a specific physical channel, signal, or message of the interfering cell; the compensating unit 33 is configured to compensate the channel estimation matrix by using the downlink cell-specific power ratio information, to obtain a new channel estimation matrix; the reconstructing unit 34 is configured to reconstruct a received signal from a specific physical channel, signal, or message of the intra-frequency neighboring cell according to the new channel estimation matrix; and the interference cancellation unit 35 is configured to cancel, in a received original signal, a received signal from a specific physical channel, signal, or message, to implement interference cancellation on the specific physical channel, signal, or message.

Optionally, the obtaining unit includes: a first obtaining unit and/or a second obtaining unit, where the first obtaining unit is configured to obtain the downlink cell-specific power ratio information of the intra-frequency neighboring cell by using a physical broadcast channel PBCH, and the second obtaining unit is configured to obtain the downlink cell-specific power ratio information of the intra-frequency neighboring cell by using a system information block SIB message.

An embodiment of the present invention further provides another interference cancellation apparatus in a Long Term Evolution system, where the apparatus includes: an obtaining unit, an estimating unit, a compensating unit, a reconstructing unit, and an interference cancellation unit.

The obtaining unit is configured to obtain downlink cell-specific power ratio information of a specific cell, where the specific cell includes a neighboring cell or a serving cell. The obtaining unit specifically includes: a first receiving unit, a second receiving unit, a third receiving unit, and/or a fourth receiving unit. The first receiving unit is configured to receive the downlink cell-specific power ratio information of the specific cell, which is unicast on a network side by using an RRC message; the second receiving unit is configured to receive the downlink cell-specific power ratio information of the specific cell and a physical cell identifier of the specific cell, which are unicast on a network side by using an RRC message; the third receiving unit is configured to receive the downlink cell-specific power ratio information of the specific cell, or the downlink cell-specific power ratio information and a physical cell identifier of the specific cell, broadcast on a network side by using a physical broadcast channel PBCH; and the fourth receiving unit is configured to receive a system information block SIB message broadcast on a network side, where the system information block SIB message includes: the downlink cell-specific power ratio information of the specific cell, or the downlink cell-specific power ratio information and a physical cell identifier of the specific cell.

The estimating unit is configured to perform channel estimation based on a downlink cell-specific reference signal CRS of the specific cell, to obtain a channel estimation matrix of a specific physical channel, signal, or message of the specific cell. A specific estimating process is a technology well known to a person skilled in the art, and is therefore not described herein again.

The compensating unit is configured to compensate the channel estimation matrix by using the downlink cell-specific power ratio information of the specific cell, to obtain a new channel estimation matrix.

The reconstructing unit is configured to reconstruct a received signal from the specific physical channel, signal, or message of the specific cell according to the new channel estimation matrix.

The interference cancellation unit is configured to cancel, in an original signal received from a target cell, interference caused by the intra-frequency specific cell, which is not the target cell, in a received signal from a specific physical channel, signal, or message, where the target cell includes a serving cell or a neighboring cell, where the target cell includes a serving cell or a neighboring cell.

Optionally, the downlink cell-specific power ratio information obtained by the obtaining unit includes: a power ratio factor or a power difference factor between transmit power of the specific physical channel, signal, or message and transmit power of the reference signal CRS; or a power ratio factor or a power difference factor between transmit power of the reference signal CRS and transmit power of the specific physical channel, signal, or message. However, the present invention is not limited thereto, and the downlink cell-specific power ratio information may further adaptively include other similar parameters.

Figure 4:
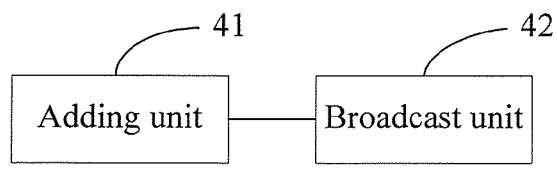
FIG. 4 is a schematic structural diagram of a data sending apparatus in a Long Term Evolution system according to an embodiment of the present invention.

Correspondingly, an embodiment of the present invention further provides a data sending apparatus in a Long Term Evolution system. FIG. 4 shows a schematic structural diagram of the apparatus. The apparatus includes: an adding unit 41 and a broadcast unit 42 The adding unit 41 is configured to add downlink cell-specific power ratio information to a broadcast message, where the downlink cell-specific power ratio information added to the broadcast message includes: a power ratio factor or a power difference factor between transmit power of a specific physical channel, signal, or message and transmit power of a reference signal CRS; or a power ratio factor or a power difference factor between transmit power of a reference signal CRS and transmit power of a specific physical channel, signal, or message. The broadcast unit 42 is configured to broadcast the broadcast message to each node (for example, a user equipment), so that the node (for example, the user equipment) that receives the broadcast message performs interference cancellation.

The broadcast unit includes a first broadcast unit and/or a second broadcast unit, where the first broadcast unit is configured to broadcast the broadcast message to the user equipment by using a physical broadcast channel PBCH, and the second broadcast unit is configured to broadcast a system information block SIB message to the user equipment, where the broadcast message is the system information block SIB message.

Figure 4A:
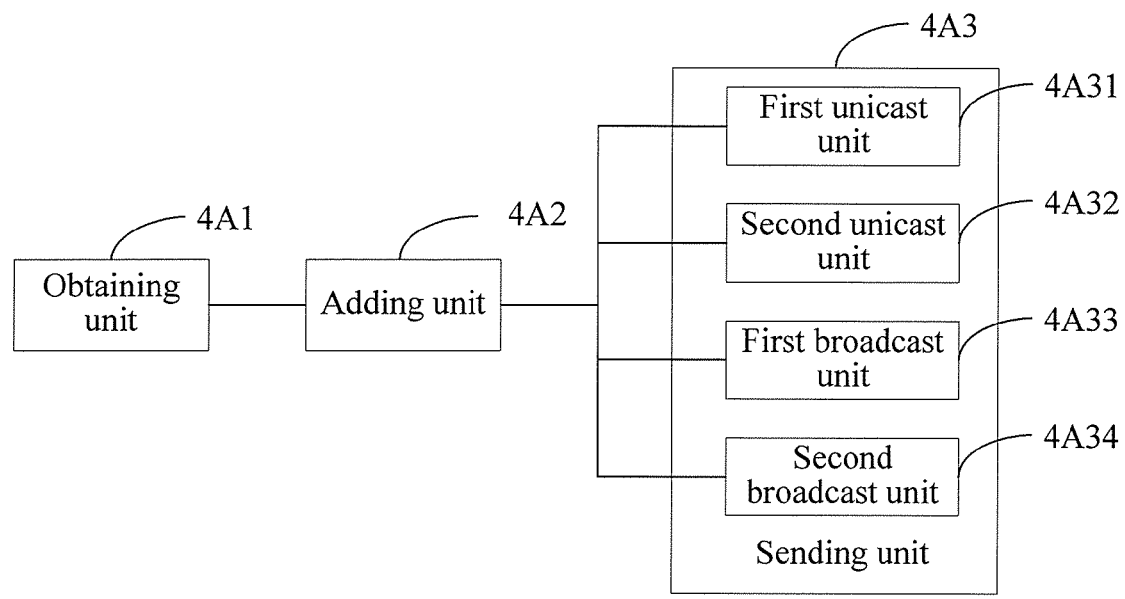
FIG. 4A is a schematic structural diagram of another data sending apparatus in a Long Term Evolution system according to an embodiment of the present invention.

Correspondingly, an embodiment of the present invention further provides another data sending apparatus in a Long Term Evolution system. FIG. 4A shows a schematic structural diagram of the apparatus. The apparatus includes: an obtaining unit 4A1, an adding unit 4A2, and a sending unit 4A3. The obtaining unit 4A1 is configured to obtain downlink cell-specific power ratio information of a specific cell, or obtain downlink cell-specific power ratio information and a physical cell identifier of a specific cell; the adding unit 4A2 is configured to add the downlink cell-specific power ratio information of the specific cell, or the downlink cell-specific power ratio information of the specific cell and the physical cell identifier of the specific cell to a radio resource control RRC message, or add the downlink cell-specific power ratio information of the specific cell to a broadcast message; and the sending unit 4A3 is configured to unicast the RRC message or broadcast the broadcast message to a user terminal, so that the user terminal that receives the RRC message or the broadcast message performs interference cancellation.

Optionally, the sending unit 4A3 includes: a first unicast unit 4A31, a second unicast unit 4A32, a first broadcast unit 4A33, and/or a second broadcast unit 4A34. For a schematic structural diagram of the sending unit 4A3, also refer to FIG. 4A. In FIG. 4A, the sending unit including the several unicast and broadcast units at the same time is used as an example. The first unicast unit 4A31 is configured to unicast the downlink cell-specific power ratio information of the specific cell by using a radio resource control information element in the RRC message; the second unicast unit 4A32 is configured to unicast the downlink cell-specific power ratio information of the specific cell and the physical cell identifier of the specific cell by using a radio resource control information element or a measurement information element (but the present invention is not limited thereto) in the RRC message; the first broadcast unit 4A33 is configured to broadcast the downlink cell-specific power ratio information, or the downlink cell-specific power ratio information and the physical cell identifier of the specific cell to the user terminal by using a system master information block MIB carried on a physical broadcast channel PBCH; and the second broadcast unit 4A34 is configured to broadcast the downlink cell-specific power ratio information, or the downlink cell-specific power ratio information and the physical cell identifier of the specific cell to the user terminal by using a system information block SIB message such as an SIB2, but the present invention is not limited to the SIB2.

The downlink cell-specific power ratio information of the specific cell added by the adding unit includes: a power ratio factor or a power difference factor between transmit power of a specific physical channel, signal, or message and transmit power of a reference signal CRS; or a power ratio factor or a power difference factor between transmit power of a reference signal CRS and transmit power of a specific physical channel, signal, or message.

In this embodiment, the obtaining unit includes a first obtaining unit, a second obtaining unit, and/or a third obtaining unit. The first obtaining unit is configured to obtain downlink cell-specific power ratio information of an opposite party or obtain downlink cell-specific power ratio information and a physical cell identifier of a specific cell of the specific cell or the serving cell by using a logical interface to the specific cell or the serving cell; the second obtaining unit is configured to obtain the downlink cell-specific power ratio information of the specific cell or obtain the downlink cell-specific power ratio information and the physical cell identifier of the specific cell by using load information; and the third obtaining unit is configured to obtain the downlink cell-specific power ratio information of the specific cell or obtain the downlink cell-specific power ratio information and the physical cell identifier of the specific cell by using load information transmitted by a logical interface.

Certainly, when the specific cell that needs to perform unicast or broadcast is not a serving cell of the user terminal, the downlink cell-specific power ratio information of the specific cell, or the downlink cell-specific power ratio information and the physical cell identifier of the specific cell need to be obtained by using a logical interface between cells sharing a same feature, where the logical interface between the cells sharing a same feature includes a logical interface between the specific cell and the serving cell.

Correspondingly, an embodiment of the present invention provides a user equipment, where the user equipment includes the foregoing interference cancellation apparatus in the Long Term Evolution system. For details about functions and uses of units included in the interference cancellation apparatus in the Long Term Evolution system, refer to the foregoing description, which is not described herein again.

Correspondingly, an embodiment of the present invention provides a base station, including the foregoing data sending apparatus in the Long Term Evolution system. For details about functions and uses of units included in the data sending apparatus in the Long Tem. Evolution system, refer to the foregoing description, which is not described herein again.

To facilitate understanding by a person skilled in the art, specific application examples are described in the following.

Embodiment 1

Figure 5:
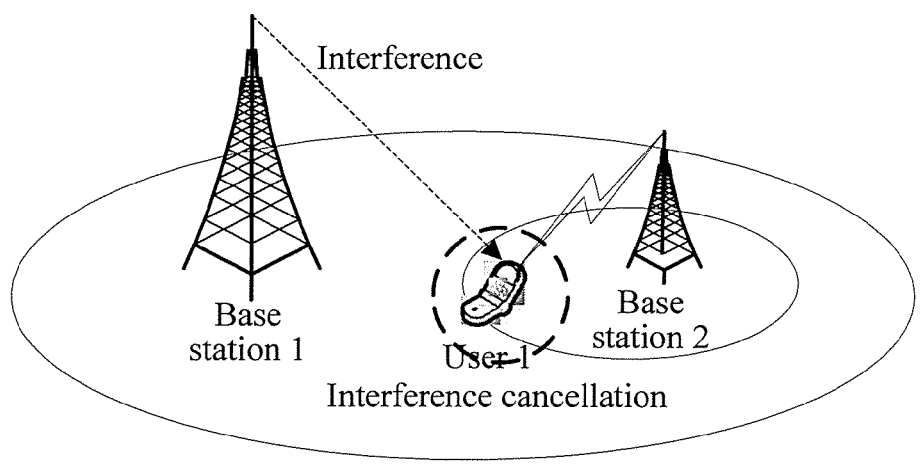
FIG. 5 is a schematic diagram of a scenario of a Long Term Evolution system according to an embodiment of the present invention.

Referring to FIG. 5, FIG. 5 is a schematic diagram of a scenario of a Long Term Evolution system according to an embodiment of the present invention, which includes a user 1, a base station 1, and a base station 2. The base station 1 is an interfering cell of the user 1, the base station 2 is a low power node and serving cell, and the base station 2 is a macro cell and interfering cell. In this embodiment, it is assumed that a serving node (for example, the base station 2) of a user terminal (for example, the user 1) is a low power node, the user terminal is an edge user within coverage of the low power node, and the user terminal is currently being subject to strong interference from an intra-frequency macro cell (for example, the base station 1). However, the present invention is not limited thereto, and this assumption is merely used as an example in this embodiment. In order to improve quality of a signal received from the serving cell, the user terminal needs to execute an interference cancellation algorithm on the user terminal. A first step of the interference cancellation algorithm is estimating strength of an interfering signal of a specific physical channel, signal, or message of a strong interfering cell, and the strength of the interfering signal may be obtained by using a broadcast message of a neighboring cell. As shown in FIG. 5, it is assumed that in this embodiment, information broadcast by the base station 1 is, for example, included in an SIB2, and useful information is a power ratio between a specific physical channel, signal, or message and a CRS.

The power ratio between the specific physical channel and the CRS in the SIB2 specifically includes: a power ratio between a physical control format indicator channel PCFICH and the CRS, a power ratio between a physical downlink control channel PDCCH and the CRS, a power ratio between a physical broadcast channel PBCH and the CRS or a power ratio between a paging channel PCH and the CRS; the power ratio between the specific message and the CRS includes: a power ratio between a system information block SIB message and the CRS; and the power ratio between the specific signal and the CRS includes: a power ratio between a primary synchronization signal PSS and the CRS or a power ratio between a secondary synchronization signal SSS and the CRS.

Figure 6:
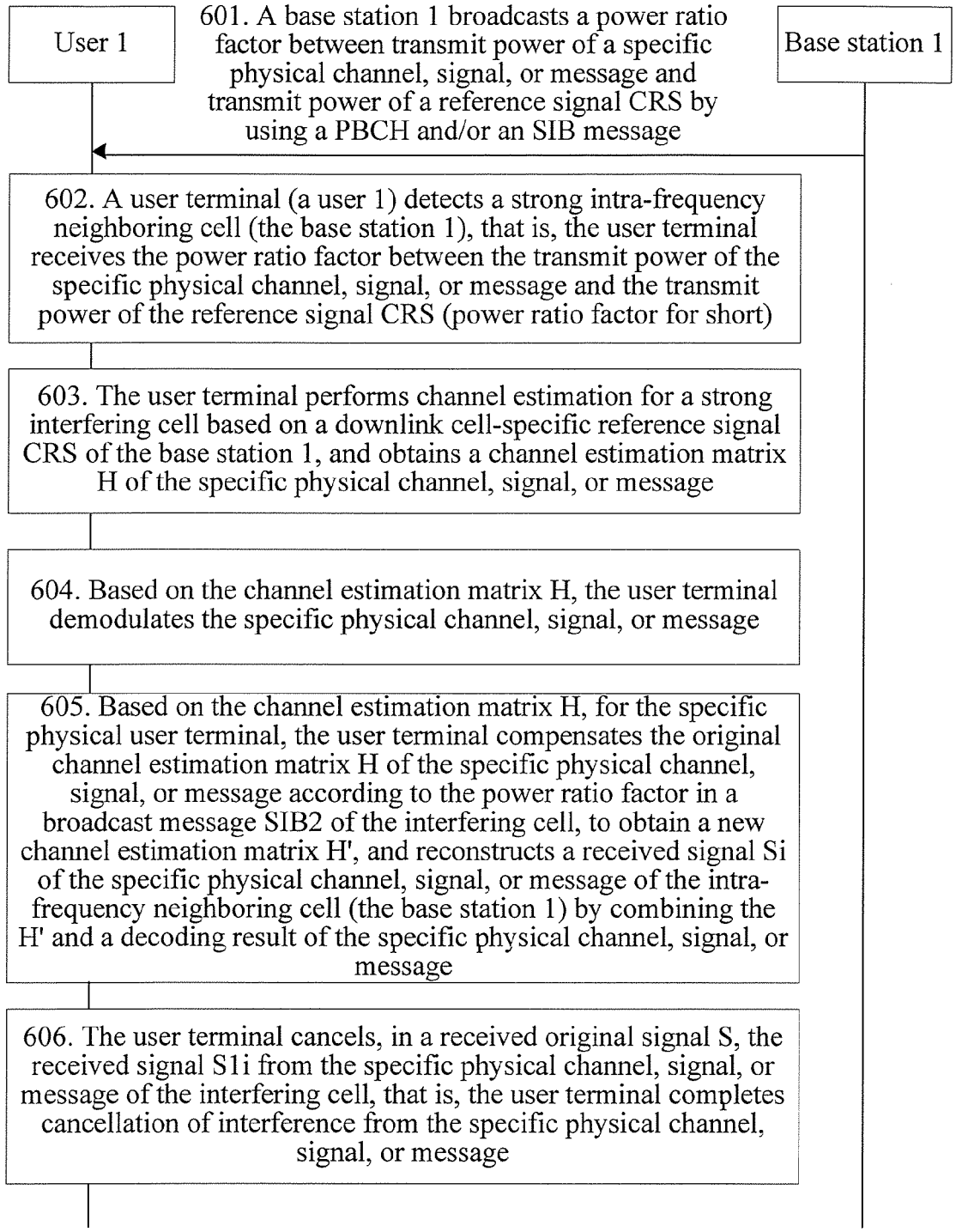
FIG. 6 is a diagram of a signaling process of an interference cancellation method in the application scenario shown in FIG. 5.

Based on the application scenario shown in FIG. 5, a signaling process involved in the embodiment of the present invention is shown in FIG. 6. FIG. 6 is a diagram of a signaling process of an interference cancellation method in the application scenario shown in FIG. 5, which includes:

Step 601: A base station 1 broadcasts a power ratio factor between transmit power of a specific physical channel, signal, or message and transmit power of a reference signal CRS by using a PBCH and/or an SIB message. Nodes (for example, base stations or entities having a function of a base station) in a network include a macro cell and a low power node, and the base station 1 is used as an example in this embodiment. The cell-specific (cell-specific) physical channel, signal, or message includes but is not limited to a PCFICH/PDCCH/PBCH/PCH/SIB message/PSS/SSS. In this embodiment, that an SIB2 carries the power ratio factor is used as an example, but the present invention is not limited thereto.

Step 602: A user terminal (a user 1) detects a strong intra-frequency neighboring cell (the base station 1), that is, the user terminal receives the power ratio factor between the transmit power of the specific physical channel, signal, or message and the transmit power of the reference signal CRS (power ratio factor for short).

Step 603: The user terminal performs channel estimation for a strong interfering cell based on a downlink cell-specific reference signal CRS of the base station 1, and obtains a channel estimation matrix H of the specific physical channel, signal, or message.

For example, if the PDCCH is used as an example, the user terminal may obtain a CRS channel estimation matrix H1 of REs of a PDCCH symbol.

Step 604: Based on the channel estimation matrix H, the user terminal demodulates the specific physical channel, signal, or message, and then performs step 605 after demodulation.

In this step, the physical channel, signal, or message that requires a cyclic redundancy check (CRC, Cyclic Redundancy Check) needs to be demodulated and decoded, and if a decoding result is correct, step 605 is performed.

Still using the PDCCH as an example, based on the channel estimation matrix H1, the user terminal demodulates and decodes the PDCCH, and then performs step 605 if a decoding result is correct. Specific demodulation and decoding processes are technologies well known to a person skilled in the art, and are therefore not described herein again.

Step 605: The user terminal compensates the original channel estimation matrix H of the specific physical channel, signal, or message according to the power ratio factor in the broadcast message SIB2 of the interfering cell, to obtain a new channel estimation matrix H', and reconstructs a received signal Si of the specific physical channel, signal, or message of the intra-frequency neighboring cell (the base station 1) by combining the H' and the decoding result of the specific physical channel, signal, or message.

Still using the PDCCH as an example, the user terminal compensates the original channel estimation matrix H1 of the PDCCH based on the power ratio factor between the PDCCH and the CRS in the broadcast message SIB2 of the interfering cell, to obtain a new channel estimation matrix H1', and reconstructs a received signal S1i of the PDCCH of the intra-frequency neighboring cell (the base station 1) by combining the HP and the decoding result of the PDCCH.

Step 606: The user terminal cancels, in a received original signal S, the received signal S1i from the specific physical channel, signal, or message of the interfering cell, that is, the user terminal completes interference cancellation on the specific physical channel, signal, or message.

Still using the PDCCH as an example, the user terminal cancels, in the received original signal S, the received signal S1i from the PDCCH of the intra-frequency interfering neighboring cell, that is, the user terminal completes interference cancellation on the PDCCH.

That is, standard updating involved in Embodiment 1 is in step 601:

1. In the broadcast message SIB2, downlink cell-specific power ratio information is added, where the downlink cell-specific power ratio information includes a power ratio between a PCFICH/PDCCH/PBCH/PCH/SIB/PSS/SSS and a CRS as follows:

| SystemInformationBlockType2 information element |
| --- |
| ```
--ASN1START
SystemInformationBlockType2 ::=        SEQUENCE {
    ac-BarringInfo                     SEQUENCE {
        ac-BarringForEmergency                 BOOLEAN,
        ac-BarringForMO-Signalling         AC-BarringConfig        OPTIONAL,
                                       --Need OP
        ac-BarringForMO-Data               AC-BarringConfig
        OPTIONAL    -- Need OP
    }
    OPTIONAL,   -- Need OP
    radioResourceConfigCommon              RadioResourceConfigCommonSIB,
    ue-TimersAndConstants                  UE-TimersAndConstants,
    freqInfo                           SEQUENCE {
        ul-CarrierFreq                     ARFCN-ValueEUTRA
        OPTIONAL,   -- Need OP
        ul-Bandwidth                       ENUMERATED {n6, n15, n25, n50,
n75, n100}
                                                   OPTIONAL,-- Need OP
        additional SpectrumEmission            Additional SpectrumEmission
    },
    mbsfn-SubframeConfigList           MBSFN-SubframeConfigList
    OPTIONAL,   -- Need OR
    timeAlignmentTimerCommon               TimeAlignmentTimer,
    dl-CellSpecificPowerRatioInfo          SEQUENCE {
        p-c                                ENUMERATED {X, 0,..., X2}
                                               OPTIONAL, -- Need OP
        p-d                                ENUMERATED {Y1, 0,..., Y2}
                                               OPTIONAL, -- Need OP
        p-e                                ENUMERATED {Z1, 0,..., Z2}
                                               OPTIONAL, -- Need OP
``` |

-continued

| SystemInformationBlockType2 information element |
|---|

```
        p-f                          ENUMERATED {M1, 0,..., M2}
                                       OPTIONAL, -- Need OP
        p-g                          ENUMERATED {N1, 0,..., N2}
                                       OPTIONAL, -- Need OP
        p-h                          ENUMERATED {K1, 0,..., K2}
                                       OPTIONAL, -- Need OP
        p-i                          ENUMERATED {H1, 0,..., H2}
    OPTIONAL, -- Need OP
        },
        ...,
        lateNonCriticalExtension     OCTET STRING
    OPTIONAL,-- Need OP
        [[   ssac-BarringForMMTEL-Voice-r9   AC-BarringConfig
    OPTIONAL,-- Need OP
             ssac-BarringForMMTEL-Video-r9   AC-BarringConfig
    OPTIONAL -- Need OP
        ]],
        [[   ac-BarringForCSFB-r 10          AC-BarringConfig
        OPTIONAL -- Need OP
        ]]
    }
    AC-BarringConfig ::=             SEQUENCE {
       ac-BarringFactor              ENUMERATED {
                                       p00, p05, p10, p15, p20, p25, p30, p40,
                                       p50, p60, p70, p75, p80, p85, p90, p95},
       ac-BarringTime                ENUMERATED {s4, s8, s16, s32, s64, s128,
    s256, s512},
       ac-BarringForSpecialAC        BIT STRING (SIZE(5))
    }
    MBSFN-SubframeConfigList ::=     SEQUENCE   (SIZE
    (1..maxMBSFN-Allocations)) OF MBSFN-SubframeConfig
       -- ASN1STOP
```

In one case, the foregoing downlink cell-specific power ratio information is a ratio of power of a specific physical channel, signal, or message to power of a cell-specific reference signal CRS, that is:

Case 1:

TABLE 1

| SystemInformationBlockType2 field descriptions |
|---|
| dl-CellSpecificPowerRatioInfo |
| The downlink power ratio information for all UEs, which includes the cell specific parameters. It is network assistance for interference cancellation for the capable UEs in neigbor cells. |
| p-c |
| Parameter: The ratio of Physical Control Format Indicator Channel EPRE to cell-specific reference-signal EPRE in dB. |
| p-d |
| Parameter: The ratio of Physical Downlink Control Channel EPRE to cell-specific reference EPRE in dB. |
| p-e |
| Parameter: The ratio of Physical Broadcast Channel EPRE to cell-specific reference-signal EPRE in dB. |
| p-f |
| Parameter: The ratio of Paging Channel EPRE to cell-specific reference-signal EPRE in dB. |
| p-g |
| Parameter: The ratio of System information blocks EPRE to cell-specific reference-signal EPRE in dB. |
| p-h |
| Parameter: The ratio of Primary synchronization signal EPRE to cell-specific reference EPRE in dB. |

TABLE 1-continued

| SystemInformationBlockType2 field descriptions |
|---|
| p-I |
| Parameter: The ratio of Secondary synchronization signal EPRE to cell-specific reference EPRE in dB. |

In another case, the downlink cell-specific power ratio information is a ratio of power of a cell-specific reference signal CRS to power of a specific physical channel, signal, or message, that is:

Case 2:

TABLE 2

| SystemInfortnationBlockType2 field descriptions |
|---|
| dl-Contorlchannelpowerlnfo |
| The downlink control channel power information for all UEs, which includes the cell specific parameters. It is network assistance for interference cancellation for the capable UEs in neigbor cells. |
| p-c |
| Parameter: The ratio of cell-specific reference-signal EPRE to Physical Control Format Indicator Channel EPRE in dB. |
| p-d |
| Parameter: The ratio of cell-specific reference EPRE to Physical Downlink Control Channel EPRE in dB. |
| p-e |
| Parameter: The ratio of cell-specific reference-signal EPRE to Physical Broadcast Channel EPRE in dB. |

TABLE 2-continued

| SystemInfortnationBlockType2 field descriptions |
| --- |
| p-f |
| Parameter: The ratio of cell-specific reference-signal EPRE to Paging Channel EPRE in dB. |
| p-g |
| Parameter: The ratio of cell-specific reference-signal EPRE to System information blocks EPRE in dB. |
| p-h |
| Parameter: The ratio of cell-specific reference EPRE to Primary synchronization signal EPRE in dB. |
| p-i |
| Parameter: The ratio of cell-specific reference EPRE to Secondary synchronization signal EPRE in dB. |

In this embodiment, in the foregoing Table 1 and Table 2, p-c is merely a naming manner, and a physical meaning indicated by p-c is a ratio between power of the PCFICH on each RE and power of the cell-specific reference signal CRS on each RE, where a specific form may be $$10\log\left(\frac{PCFICH\ EPRE}{CRS\ EPRE}\right) \text{ or } 10\log\left(\frac{CRS\ EPRE}{PCFICH\ EPRE}\right),$$

where X1 to X2 is a value (in dB) range of p-c;

p-d is merely a naming manner, and a physical meaning indicated by p-d is a ratio between power of the PDCCH on each RE and power of the cell-specific reference signal CRS on each RE, where a specific form may be $$10\log\left(\frac{PDCCH\ EPRE}{CRS\ EPRE}\right) \text{ or } 10\log\left(\frac{CRS\ EPRE}{PDCCH\ EPRE}\right),$$

where Y1 to Y2 is a value (in dB) range of p-d;

p-e is merely a naming manner, and a physical meaning indicated by p-e is a ratio between power of the PBCH on each RE and power of the cell-specific reference signal CRS on each RE, where a specific form may be $$10\log\left(\frac{PBCH\ EPRE}{CRS\ EPRE}\right) \text{ or } 10\log\left(\frac{CRS\ EPRE}{PBCH\ EPRE}\right),$$

where Z1 to Z2 is a value (in dB) range of p-e;

p-f is merely a naming manner, and a physical meaning indicated by p-f is a ratio between power of the PCH on each RE and power of the cell-specific reference signal CRS on each RE, where a specific form may be $$10\log\left(\frac{PCH\ EPRE}{CRS\ EPRE}\right) \text{ or } 10\log\left(\frac{CRS\ EPRE}{PCH\ EPRE}\right),$$

where M1 to M2 is a value (in dB) range of p-f;

p-g is merely a naming manner, and a physical meaning indicated by p-g is a ratio between power of the SIB (which may be a specific SIB message such as SIB1 to SIB13) on each RE and power of the cell-specific reference signal CRS on each RE, where a specific form may be $$10\log\left(\frac{SIB\ EPRE}{CRS\ EPRE}\right) \text{ or } 10\log\left(\frac{CRS\ EPRE}{SIB\ EPRE}\right),$$

where N1 to N2 is a value (in dB) range of p-g;

p-h is merely a naming manner, and a physical meaning indicated by p-h is a ratio between power of the PSS on each RE and power of the cell-specific reference signal CRS on each RE, where a specific form may be $$10\log\left(\frac{PSS\ EPRE}{CRS\ EPRE}\right) \text{ or } 10\log\left(\frac{CRS\ EPRE}{PSS\ EPRE}\right),$$

where K1 to K2 is a value (in dB) range of p-h; and p-i is merely a naming manner, and a physical meaning indicated by p-i is a ratio between power of the SSS on each RE and power of the cell-specific reference signal CRS on each RE, where a specific form may be $$10\log\left(\frac{SSS\ EPRE}{CRS\ EPRE}\right) \text{ or } 10\log\left(\frac{CRS\ EPRE}{SSS\ EPRE}\right),$$

where H1 to H2 is a value (in dB) range of p-l.

Embodiment 2

A scenario of this embodiment is similar to that of Embodiment 1, and a difference between this embodiment and Embodiment 1 lies in that broadcast information described in this embodiment is included in an SIB2 and useful information is a power difference or a power difference factor between a specific physical channel, signal, or message and a CRS.

A signaling process in this embodiment is also similar to the signaling process in Embodiment 1, and a difference lies in that the power ratio factor in Embodiment 1 is replaced by the power difference factor, which is specifically:

in a first step, nodes in a network that include a macro cell and a low power node broadcast a power difference factor between transmit power of a specific physical channel, signal, or message and transmit power of a reference signal CRS by using a PBCH and/or an SIB message. In addition, the cell-specific physical channel, signal, or message includes but is not limited to a PCFICH/PDCCH/PBCH/PCH/SIB message/PSS/SSS. In this embodiment, that an SIB2 carries the power difference factor is used as an example.

Implementation processes of other steps are similar, and for details, refer to the foregoing description, which is not described herein again.

Standard updating involved in Embodiment 2 of the present invention is also in the first step:

1. In the broadcast message SIB2, downlink cell-specific power ratio information is added, where the downlink cell-specific power ratio information includes a power difference between a PCFICH/PDCCH/PBCH/PCH/SIB/PSS/SSS and a CRS as follows:

| SystemInformationBlockType2 information element |
| --- |

```
-- ASN1START
SystemInformationBlockType2 ::=        SEQUENCE {
    ac-BarringInfo                      SEQUENCE {
        ac-BarringForEmergency              BOOLEAN,
        ac-BarringForMO-Signalling          AC-BarringConfig
OPTIONAL,-- Need OP
        ac-BarringForMO-Data            AC-BarringConfig
OPTIONAL -- Need OP
    }OPTIONAL,    -- Need OP
    radioResourceConfigCommon
RadioResourceConfigCommonSIB,
    ue-TimersAndConstants           UE-TimersAndConstants,
    freqInfo                        SEQUENCE {
        ul-CarrierFreq                  ARFCN-ValueEUTRA
OPTIONAL,-- Need OP
        ul-Bandwidth                    ENUMERATED {n6, n15, n25,
n50, n75, n100}
OPTIONAL,-- Need OP
        additionalSpectrumEmission
AdditionalSpectrumEmission
    },
    mbsfn-SubframeConfigList        MBSFN-SubframeConfigList
OPTIONAL,        -- Need OR
    timeAlignmentTimerCommon        TimeAlignmentTimer,
    dl-ContorlchannelpowerInfo      SEQUENCE {
        deltaPower-c                    ENUMERATED {X3, 0,...,
X4}
                                        OPTIONAL, --Need
OP
        deltaPower-d                    ENUMERATED {Y3, 0,...,
Y4}
                                        OPTIONAL, -- Need
OP
        deltaPower-e,                   ENUMERATED {Z3, 0,...,
Z4}
                                        OPTIONAL, -- Need
OP
        deltaPower-f                    ENUMERATED {M3, 0,...,
M4}
                                        OPTIONAL, -- Need
OP
        deltaPower-                     ENUMERATED {N3, 0,...,
N4}
                                        OPTIONAL, -- Need
OP
        deltaPower-h                    ENUMERATED {K3, 0,...,
K4}
                                        OPTIONAL, -- Need
OP
        deltaPower-l                    ENUMERATED {H3, 0,..., H4}
                                        OPTIONAL, -- Need
OP
    },
    ...,
    lateNonCriticalExtension        OCTET STRING
OPTIONAL, -- Need OP
    [[  ssac-BarringForMMTEL-Voice-r9      AC-BarringConfig
        OPTIONAL,      Need OP
        ssac-BarringForMMTEL-Video-r9      AC-BarringConfig
        OPTIONAL - Need OP
    ]],
    [[  ac-BarringForCSFB-r10              AC-BarringConfig
        OPTIONAL -- Need OP
    ]]
}
AC-BarringConfig ::=            SEQUENCE {
    ac-BarringFactor                ENUMERATED {
                                    p00, p05, p10, p15, p20, p25, p30, p40,
                                    p50, p60, p70, p75, p80, p85, p90, p95},
    ac-BarringTime                  ENUMERATED {s4, s8, s16, s32, s64, s128,
s256, s512},
    ac-BarringForSpecialAC          BIT STRING (SIZE(5))
}
MBSFN-SubframeConfigList ::=    SEQUENCE (SIZE
(1..maxMBSFN-Allocations)) OF MBSFN-SubframeConfig
-- ASN1STOP
```

In one case, the foregoing downlink cell-specific power ratio information is a difference between power of a specific physical channel, signal, or message and power of a cell-specific reference signal CRS, that is:

Case 1:

TABLE 3

SystemInformationBlockType2 field descriptions dl-CellSpecificPowerRatioInfo

The downlink power ratio information for all UEs, which includes the cell specific parameters.
It is network assistance for interference cancellation for the capable UEs in neigbor cells.
deltaPower-c Parameter: The power difference between the Physical Control Format Indicator Channel EPRE and the cell-specific reference-signal EPRE in dB.
deltaPower-d Parameter: The power difference between the Physical Downlink Control Channel EPRE and the cell-specific reference EPRE in dB.
deltaPower-e Parameter: The power difference between the Physical Broadcast Channel EPRE and the cell-specific reference-signal EPRE in dB.
deltaPower-f Parameter: The power difference between the Paging Channel EPRE and the cell-specific reference-signal EPRE in dB.
deltaPower-g Parameter: The power difference between the System information blocks EPRE and the cell-specific reference-signal EPRE in dB.
deltaPower-h Parameter: The power difference between the Primary synchronization signal EPRE and the cell-specific reference EPRE in dB.
deltaPower-I Parameter: The power difference between the Secondary synchronization signal EPRE and the
cell-specific reference EPRE in dB.

In another case, the downlink cell-specific power ratio information is a difference between power of a cell-specific reference signal CRS and power of a specific physical channel, signal, or message, that is:

Case 2:

TABLE 4

SystemInformationBlockType2 field descriptions dl-ContorlchannelpowerInfo

The downlink control channel power information for all UEs, which includes the cell specific parameters.
It is network assistance for interference cancellation for the capable UEs in neigbor cells.
deltaPower-c Parameter: The power difference between the cell-specific reference-signal EPRE and the Physical Control Format Indicator Channel EPRE in dB.
deltaPower-d Parameter: The power difference between the cell-specific reference EPRE and the Physical Downlink Control Channel EPRE in dB.

TABLE 4-continued

SystemInformationBlockType2 field descriptions deltaPower-e

Parameter: The power difference between the cell-specific reference-signal EPRE and the
Physical Broadcast Channel EPRE in dB.

TABLE 4-continued

SystemInformationBlockType2 field descriptions deltaPowerf

Parameter: The power difference between the cell-specific reference-signal EPRE and
the Paging Channel EPRE in dB.
deltaPower-g Parameter: The power difference between the cell-specific reference-signal EPRE and the
System information blocks EPRE in dB.
deltaPower-h Parameter: The power difference between the cell-specific reference EPRE and the Primary synchronization signal EPRE in dB.
deltaPower-I Parameter: The power difference between the cell-specific reference EPRE and the Secondary synchronization signal EPRE in dB.

In this embodiment, in the foregoing Table 3 and Table 4, deltaPower-c is merely a naming manner, and a physical meaning indicated by deltaPower-c is a difference between power of the PCFICH on each RE and power of the cell-specific reference signal CRS on each RE, where a specific form may be PCFICH EPRE-CRS EPRE or CRS EPRE-PCFICH EPRE, where X3 to X4 is a value (in dB) range of deltaPower-c;

deltaPower-d is merely a naming manner, and a physical meaning indicated by deltaPower-d is a difference between power of the PDCCH on each RE and power of the cell-specific reference signal CRS on each RE, where a specific form may be PDCCH EPRE-CRS EPRE or CRS EPRE-PDCCH EPRE, where Y3 to Y4 is a value (in dB) range of deltaPower-d;

deltaPower-e is merely a naming manner, and a physical meaning indicated by deltaPower-e is a difference between power of the PBCH on each RE and power of the cell-specific reference signal CRS on each RE, where a specific form may be PBCH EPRE-CRS EPRE or CRS EPRE-PBCH EPRE, where Z3 to Z4 is a value (in dB) range of deltaPower-e;

deltaPower-f is merely a naming manner, and a physical meaning indicated by deltaPower-f is a difference between power of the PCH on each RE and power of the cell-specific reference signal CRS on each RE, where a specific form may be PCH EPRE-CRS EPRE or PCH EPRE-CRS EPRE, where M3 to M4 is a value (in dB) range of deltaPower-f;

deltaPower-g is merely a naming manner, and a physical meaning indicated by deltaPower-g is a difference between power of the SIB (which may be a specific SIB message such as SIB1 to SIB13) on each RE and power of the cell-specific reference signal CRS on each RE, where a specific form may be SIB EPRE-CRS EPRE or CRS EPRE-SIB EPRE, where N3 to N4 is a value (in dB) range of deltaPower-g;

deltaPower-h is merely a naming manner, and a physical meaning indicated by deltaPower-h is a difference between power of the PSS on each RE and power of the cell-specific reference signal CRS on each RE, where a specific form may be PSS EPRE-CRS EPRE or CRS EPRE-PSS EPRE, where K3 to K4 is a value (in dB) range of deltaPower-h; and deltaPower-i is merely a naming manner, and a physical meaning indicated by deltaPower-i is a difference between power of the SSS on each RE and power of the cell-specific reference signal CRS on each RE, where a specific form may be SSS EPRE-CRS EPRE or CRS EPRE-SSS EPRE, where H3 to H4 is a value (in dB) range of deltaPower-1.

Embodiment 3

Embodiment 3 is similar to Embodiment 1 or Embodiment 2 in step, and they differ only in a carrier that carries network information. It is assumed that a power difference factor or a power ratio factor is carried by an MIB on a PBCH.

An example of involved signaling changing is:

Example 1

| MasterInformationBlock |  |
|---|---|
| -- ASN1START |  |
| MasterInformationBlock ::= | SEQUENCE { |
| dl-Bandwidth | ENUMERATED { |
|  | n6, n15, n25, n50, n75, n100}, |

-continued

| MasterInformationBlock |  |
|---|---|
| phich-Config | PHICH-Config, |
| systemFrameNumber | BIT STRING (SIZE (8)), |
| spare | BIT STRING (SIZE (10)) |
| dl-CellSpecificPowerRatioInfo | SEQUENCE { |
| p-c | ENUMERATED {X1, 0,..., X2} |
|  | OPTIONAL, -- Need OP |
| p-d | ENUMERATED {Y1, 0,..., Y2} |
|  | OPTIONAL, -- Need OP |
| p-e | ENUMERATED {Z1, 0,..., Z2} |
|  | OPTIONAL, -- Need OP |
| p-f | ENUMERATED {M1, 0,..., M2} |
|  | OPTIONAL, -- Need OP |
| p-g | ENUMERATED {N1, 0,..., N2} |
|  | OPTIONAL, -- Need OP |
| p-h | ENUMERATED {K1, 0,..., K2} |
|  | OPTIONAL, -- Need OP |
| p-i | ENUMERATED {H1, 0,..., H2} |
|  | OPTIONAL, -- Need OP |
| } |  |
| } |  |
| } |  |
| -- ASN1STOP |  |

Example 2

| MasterInformationBlock |  |
|---|---|
| -- ASN1START |  |
| MasterInformationBlock ::= | SEQUENCE { |
| dl-Bandwidth | ENUMERATED { |
|  | n6, n15, n25, n50, n75, n100}, |
| phich-Config | PHICH-Config, |
| systemFrameNumber | BIT STRING (SIZE (8)), |
| spare | BIT STRING (SIZE (10)) |
| dl-ContorlchannelpowerInfo | SEQUENCE { |
| deltaPower-c | ENUMERATED {X3, 0,..., X4} |
|  | OPTIONAL, --Need OP |
| deltaPower-d | ENUMERATED {Y3, 0,..., Y4} |
|  | OPTIONAL, --Need OP |
| deltaPower-e | ENUMERATED {Z3, 0,..., Z4} |
|  | OPTIONAL, --Need OP |
| deltaPower-f | ENUMERATED {M3, 0,..., M4} |
|  | OPTIONAL, --Need OP |
| deltaPower-g | ENUMERATED {N3, 0,..., N4} |
|  | OPTIONAL, --Need OP |
| deltaPower-h | ENUMERATED {K3, 0,..., K4} |
|  | OPTIONAL, --Need OP |
| deltaPower-l | ENUMERATED {H3, 0,..., H4} |
|  | OPTIONAL, --Need OP |
| } |  |
| } |  |
| -- ASN1STOP |  |

Embodiment 4

Figure 7:
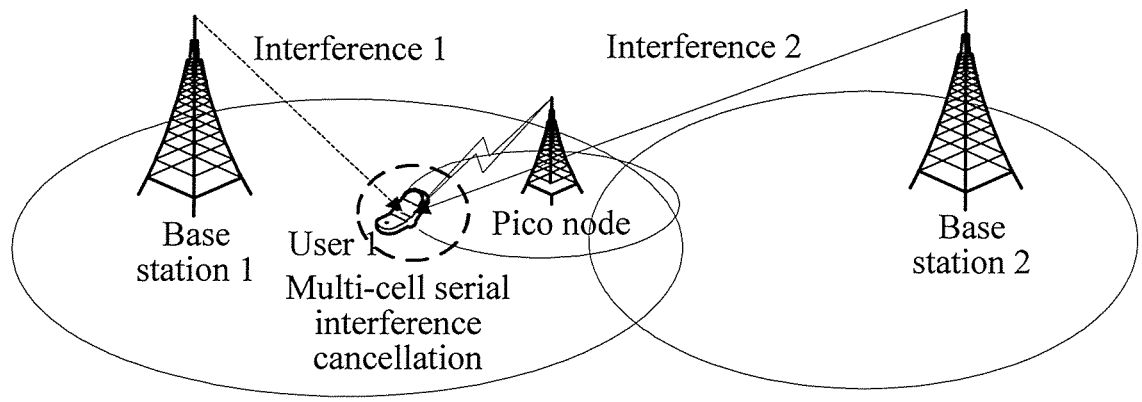
FIG. 7 is a schematic diagram of a scenario of another Long Term Evolution system according to an embodiment of the present invention.

Refer to FIG. 7, which is a schematic diagram of a scenario of another Long Term Evolution system according to an embodiment of the present invention. A user 1, a base station 1, a base station 2, and a pico node are included. The base station 1 and the base station 2 are interfering cells of the user 1. The pico node is a low power node and serving cell. Both the base station 1 and the base station 2 are macro cells and interfering cells. The user 1 needs to successively cancel interference from the base station 1 and the base station 2 by using multi-cell serial interference cancellation. In this embodiment, an intra-frequency neighboring cell is merely used as an example, but the present invention is not limited thereto. It should be noted that the intra-frequency neighboring cell is an application example, a special case, or a subset of neighboring cells among specific cells. Certainly, the specific cell may also be a serving cell, and the intra-frequency neighboring cell herein may be replaced by a neighboring cell or a serving cell, and in this case, implementation processes are similar. In this embodiment, the intra-frequency neighboring cell is used as an example.

It is assumed that a serving node (for example, the pico node) of the user 1 is a low power node, and the user 1 is an edge user within coverage of the low power node and is currently being subject to strong interference from multiple intra-frequency macro cells. As shown in the diagram, the base station 1 and the base station 2 cause two strong interferences, which are interference 1 and interference 2. In order to improve quality of a signal received from the serving cell, the user 1 needs to execute a multi-cell serial interference cancellation algorithm on a user terminal. A first step of the interference cancellation algorithm is estimating a specific physical channel, signal, or message of a strong interfering cell, and the strength of the interfering signal may be obtained by reading a broadcast message of a neighboring cell. As shown in FIG. 7, it is assumed that information that is broadcast in this embodiment is included in an SIB2, and useful information is a power ratio between a specific physical channel, signal, or message and a CRS, and it is assumed that N strong interfering cells exist in a system. In this embodiment, that N=2 is used as example, that is, there are two interfering cells, but the present invention is not limited thereto.

Figure 8A:
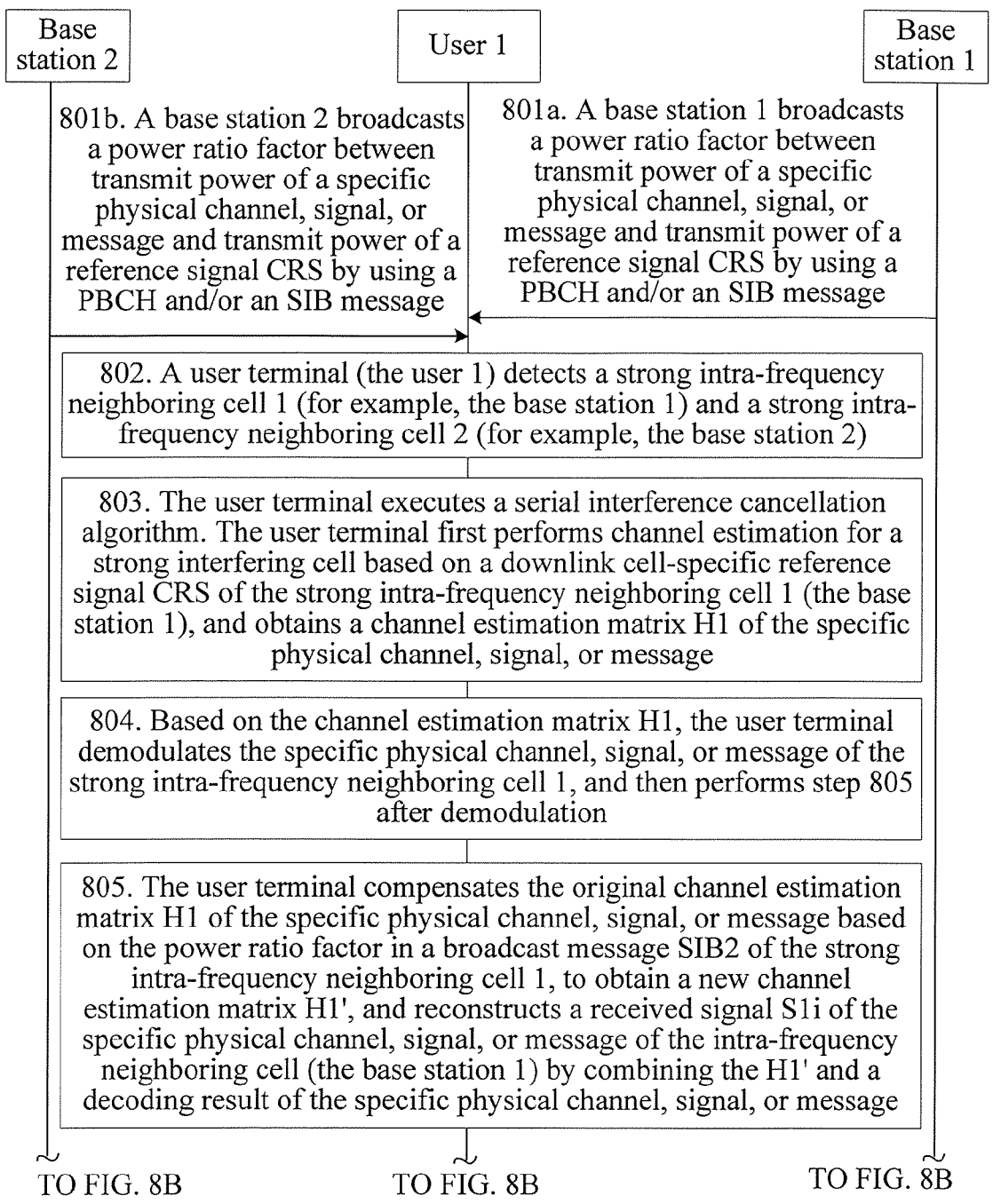
Figure 9:
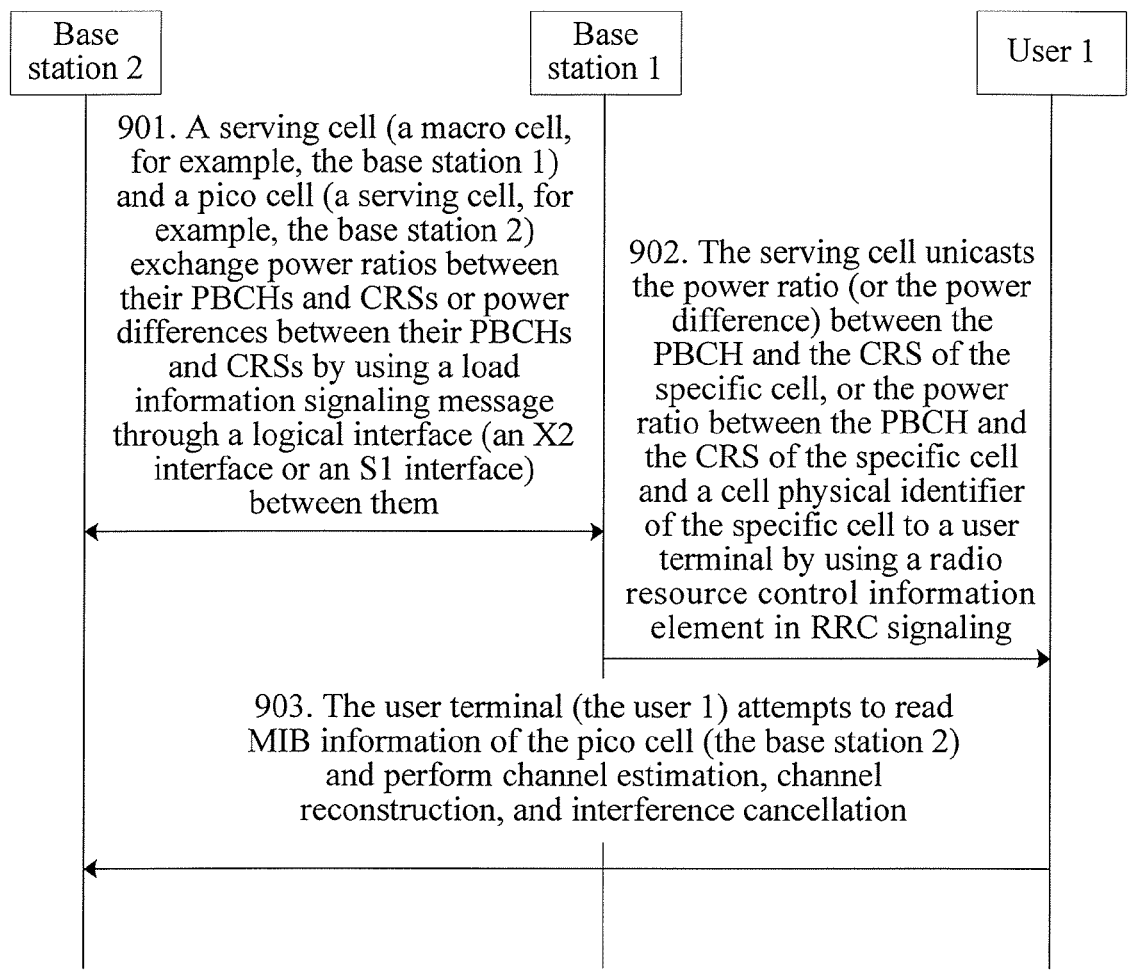
FIG. 9 is a diagram of a signaling process of an interference cancellation method in another application scenario shown in FIG. 5.

Based on the application scenario shown in FIG. 7, a signaling process involved in the embodiment of the present invention is shown in FIG. 8A and FIG. 8B. FIG. 8A and FIG. 8B are a diagram of a signaling process of an interference cancellation method in the application scenario shown in FIG. 7, which includes:

Step 801a and step 801b: Each of a base station 1 and a base station 2 broadcast a power difference factor between transmit power of a specific physical channel, signal, or message and transmit power of a reference signal CRS by using a PBCH and/or an SIB message. Nodes in a network include a macro cell and a low power node, and the base station 1 and the base station 2 are used as examples in this embodiment. The cell-specific physical channel, signal, or message includes but is not limited to a PCFICH/PDCCH/PBCH/PCH/SIB message/PSS/SSS. In this embodiment, that an SIB2 carries the power difference factor is used as an example.

Step 802: A user terminal (a user 1) detects a strong intra-frequency neighboring cell 1 (for example, the base station 1) and a strong intra-frequency neighboring cell 2 (for example, the base station 2).

Step 803: The user terminal executes a serial interference cancellation algorithm. The user terminal first performs channel estimation for a strong interfering cell based on a downlink cell-specific reference signal CRS of the strong intra-frequency neighboring cell 1 (the base station 1), and obtains a channel estimation matrix H1 of the specific physical channel, signal, or message.

Step 804: Based on the channel estimation matrix H1, the user terminal demodulates the specific physical channel, signal, or message of the strong intra-frequency neighboring cell 1, and then performs step 805 after demodulation.

In this step, the physical channel, signal, or message that requires a CRC (cyclic redundancy check) needs to be demodulated and decoded, and if a decoding result is correct, step 805 is performed.

Step 805: The user terminal compensates the original channel estimation matrix H1 of the specific physical channel, signal, or message based on the power ratio factor in the broadcast message SIB2 of the strong intra-frequency neighboring cell 1, to obtain a new channel estimation matrix H1', and reconstructs a received signal S1i of the specific physical channel, signal, or message of the intra-frequency neighboring cell (the base station 1) by combining the H1' and the decoding result of the specific physical channel, signal, or message.

Step 806: The user terminal cancels, in a received original signal S, the received signal S1i from the specific physical channel, signal, or message of the strong intra-frequency neighboring cell 1, that is, the user terminal completes interference cancellation on the specific physical channel, signal, or message of the strong intra-frequency neighboring cell 1.

Step 807: The user terminal then performs channel estimation for the strong interfering cell based on a downlink cell-specific reference signal CRS of the strong intra-frequency neighboring cell 2 (the base station 2), and obtains a channel estimation matrix H2 of the specific physical channel, signal, or message.

Step 808: Based on the channel estimation matrix H2, the user terminal demodulates the specific physical channel, signal, or message of the strong intra-frequency neighboring cell 2, and then performs step 809 after demodulation.

In this embodiment, the physical channel, signal, or message that requires a CRC (cyclic redundancy check) needs to be demodulated and decoded, and if a decoding result is correct, step 809 is performed.

Step 809: The user terminal compensates the original channel estimation matrix H1 of the specific physical channel, signal, or message based on the power difference factor in the broadcast message SIB2 of the strong intra-frequency neighboring cell 2, to obtain a new channel estimation matrix H2', and reconstructs a received signal S2i of the specific physical channel, signal, or message of the intra-frequency neighboring cell (the base station 2) by combining the H2' and the decoding result of the specific physical channel, signal, or message.

Step 810: The user terminal cancels, in a received signal S' in which strong interference from the intra-frequency neighboring cell 1 is already canceled, the received signal S2i from the specific physical channel, signal, or message of the strong intra-frequency neighboring cell 2, so as to complete multi-cell serial interference cancellation on the specific physical channels, signals, or messages of the strong intra-frequency neighboring cell 1 and the strong intra-frequency neighboring cell 2.

In step 803 to step 806 and step 807 to step 810, the multi-cell serial interference cancellation algorithm is executed. Certainly, in this embodiment, the interference from the base station 2 may be first canceled, and then the interference from the base station 1 is canceled. Signaling and examples in this embodiment are the same as those in Embodiment 1, Embodiment 2, and Embodiment 3. For details, refer to the foregoing description, which is not described herein again.

Embodiment 5

This embodiment provides a HetNet inter-cell interference cancellation scenario. FIG. 5 is still used as an example. Specifically, as shown in FIG. 5, it is assumed that a user terminal is moving from a macro cell (a base station 1) to a pico cell (a base station 2). Because of mobility, the user terminal prepares to perform handover to the pico cell. However, at this time, the macro cell is a serving cell of the user terminal, and the user terminal may need to read an MIB message, which is carried on a PBCH, of a target cell pico before being handed over to the pico cell, so as to judge and determine that the user terminal can be handed over to the target cell. When the MIB message of the target cell is read, a PBCH of the serving cell causes strong interference to a signal received from the target cell. Therefore, the interference from the PBCH of the serving cell needs to be canceled on a user terminal side. In this embodiment, the specific physical channel PBCH is used as an example for description, but the present invention is not limited thereto, and content of the present invention may also be applicable to other specific physical channels besides the PBCH, specific messages, and specific signals.

Step 901: A serving cell (a macro cell, for example, the base station 1) and a pico cell (a serving cell, for example, the base station 2) exchange power ratios between their PBCHs and CRSs or power differences between their PBCHs and CRSs by using a load information, signaling message, through a logical interface (an X2 interface or an S1 interface) between them.

Signaling example: LOAD INFORMATION

This message is sent by an eNB to neighbouring eNBs to transfer load and interference co-ordination information. Direction: eNB1→eNB2. For details, refer to Table 5.

| PBCH power Information | | | | | | |
|---|---|---|---|---|---|---|
| IE/Group Name | Presence | Range | IE type and reference | Semantics description | Criticality | Assigned Criticality |
| Message Type | M | | 9.2.13 | | YES | ignore |
| Cell Information | M | | | | YES | ignore |
| >Cell Information Item | | 1 . <maxCellineNB> | | | EACH | ignore |
| >>Cell ID | M | | ECGI 9.2.14 | Id of the source cell | — | — |
| >>UL-Interference Overload Indication | O | | 9.2.17 | | — | — |
| >>UL High Interference Information | | 0 .. <maxCellineNB> | | | — | — |
| >>>Target Cell ID | M | | ECGI 9.2.14 | Id of the cell for which the HII is meant | — | — |
| >>>UL High Interference Indication | M | | 9.2.18 | | — | — |
| >>Relative Narrowband Tx Power (RNTP) | O | | 9.2.19 | | — | — |
| >>ABS Information | O | | 9.2.54 | | YES | ignore |
| >>Invoke Indication | O | | 9.2.55 | | YES | ignore |
| >>PBCH power Information | O | | 9.2.xx | | YES | ignore |

This IE provides information about the power difference between the cell-specific reference-signal EPRE and the Physical Broadcast Channel EPRE in dB.

| IE/Group Name | Presence | Range | IE type and reference | Semantics description |
|---|---|---|---|---|
| PBCH power Information | M | | ENUMERATED {dBZ1, dB0 . . . , dBZ2} | Power difference between the cell-specific reference-signal EPRE and the Physical Broadcast Channel EPRE in dB. |

Step 902: The serving cell unicasts the power ratio (or the power difference) between the PBCH and the CRS of the specific cell, or the power ratio between the PBCH and the CRS of the specific cell and a cell physical identifier of the specific cell to a user terminal (a user 1) by using a radio resource control information element in RRC signaling.

In a case in which the power ratio of the specific cell is unicast and the specific cell is a serving cell, a signaling example is:

Example 1

Among radio resource control information elements, a radio resource configuration dedicated information element is used as an example. When the power ratio between the PBCH and the CRS is unicast, a changed protocol is:

| RadioResourceConfigDedicated information element |
|---|

```
-- ASN1START
    RadioResourceConfigDedicated ::=      SEQUENCE {
        srb-ToAddModList              SRB-ToAddModList
        OPTIONAL,          -- Cond HO-Conn
        drb-ToAddModList              DRB-ToAddModList
        OPTIONAL,          -- Cond HO-toEUTRA
        drb-ToReleaseList             DRB-ToReleaseList
        OPTIONAL,          -- Need ON
```

-continued

| RadioResourceConfigDedicated information element |
|---|

```
            mac-MainConfig              CHOICE {
                explicitValue           MAC-MainConfig,
                defaultValue            NULL
            }       OPTIONAL,
-- Cond HO-toEUTRA2
            sps-Config                  SPS-Config
OPTIONAL,    -- Need ON
            physicalConfigDedicated          PhysicalConfigDedicated
OPTIONAL,    -- Need ON
            ...,
            [[  rlf-TimersAndConstants-r9
            RLF-TimersAndConstants-r9   OPTIONAL -- Need ON
            ]],
            [[  measSubframePatternPCell-r10
            MeasSubframePatternPCell-r10      OPTIONAL -- Need ON
            ]]
            [[  pbchpowerInfoPCell-r10
            PBCHpowerInfoPCell-r10                        OPTIONAL     --Need ON
            ]]
        }
        Radio Resource Config Dedicated SCell-r10 ::= SEQUENCE {
            -- UE specific   configuration   extensions
            applicable   for    an SCell
            physical Config   Dedicated   SCell-r10   Physical Config
                Dedicated     SCell-r10 OPTIONAL,-- Need ON
            ...
        }
        SRB-ToAddModList ::=    SEQUENCE (SIZE (1..2)) OF SRB-ToAddMod
        SRB-ToAddMod ::=     SEQUENCE {
            srb-Identity        INTEGER (1..2),
            rlc-Config          CHOICE {
                explicitValue         RLC-Config,
                defaultValue    NULL
            }       OPTIONAL, -- Cond Setup
            logicalChannelConfig          CHOICE {
                explicitValue         LogicalChannelConfig,
                defaultValue    NULL
            }       OPTIONAL,-- Cond Setup
            ...
        }
        DRB-ToAddModList ::=    SEQUENCE    (SIZE (1..maxDRB)) OF
        DRB-ToAddMod
        DRB-ToAddMod ::=   SEQUENCE {
            eps-BearerIdentity      INTEGER (0..15)       OPTIONAL, --
        Cond DRB-Setup
            drb-Identity        DRB-Identity,
            pdcp-Config PDCP-Config     OPTIONAL,-- Cond PDCP
            rlc-Config    RLC-Config       OPTIONAL,-- Cond Setup
            logicalChannelIdentity INTEGER (3..10) OPTIONAL,-- Cond
        DRB-Setup
            logicalChannelConfig              LogicalChannelConfig
            OPTIONAL,          -- Cond Setup
            ...
        }
        DRB-ToReleaseList ::= SEQUENCE (SIZE (1..maxDRB)) OF
        DRB-Identity
        MeasSubframePatternPCell-r10 ::= CHOICE {
            release         NULL,
            setup      Meas SubframePattern-r10
        }
        PBCHpowerInfoPCell-r10 ::= SEQUENCE {
            p-e   ENUMERATED {dBZ1, dB0,..., dBZ2}
        }
        -- ASN1STOP
```

In this embodiment, pbchpowerInfoPCell is merely a naming manner, and a physical meaning indicated by pbchpowerInfoPCell is a ratio between power of the PBCH channel of the serving cell and power of the CRS of the serving cell. As described above in this specification, p-e is a specific value of the information element pbchpowerInfoPCell.

Example 2

Among radio resource control information elements, a radio resource configuration dedicated information element is used as an example. When the power difference between the PBCH and the CRS is unicast, a changed protocol is:

| RadioResourceConfigDedicated information element |
|---|
| ```
-- ASN1START
RadioResourceConfigDedicated ::=     SEQUENCE {
    srb-ToAddModList   SRB-ToAddModList OPTIONAL,-- Cond HO-Conn
    drb-ToAddModList    DRB-ToAddModList       OPTIONAL,---Cond HO-toEUTRA
    drb-ToReleaseList DRB-ToReleaseList  OPTIONAL, -- Need ON
    mac-MainConfig       CHOICE {
        explicitValue         MAC-MainConfig,
        defaultValue     NULL
    }      OPTIONAL,-- Cond HO-toEUTRA2
    sps-Config         SPS-Config OPTIONAL,-- Need ON
    physicalConfigDedicated PhysicalConfigDedicated
    OPTIONAL, -- Need ON
    ...,
    [[  rlf-TimersAndConstants-r9
    RLF-TimersAndConstants-r9 OPTIONAL-- Need ON
    ]],
    [[  measSubframePatternPCell-r10
    MeasSubframePatternPCell-r10   OPTIONAL-- Need ON
    ]]
    [[  pbchpowerInfoPCell-r10 PBCHpowerInfoPCell-r10
    OPTIONAL   --Need ON
    ]]
}
Radio  Resource  Config  Dedicated  SCell-r10 ::= SEQUENCE {
    -- UE specific  configuration extensions applicable for an SCell
    Physical  Config  Dedicated  SCell-r10      Physical Config
    Dedicated  SCell-r10   OPTIONAL,-- Need ON
    ...
}
SRB-ToAddModList ::=   SEQUENCE (SIZE (1..2)) OF SRB-ToAddMod
SRB-ToAddMod ::= SEQUENCE {
    srb-Identity         INTEGER (1..2),
    rlc-Config        CHOICE {
        explicitValue          RLC-Config,
        defaultValue        NULL
    }      OPTIONAL, -- Cond Setup
    logicalChannelConfig     CHOICE {
        explicitValue          LogicalChannelConfig,
        defaultValue NULL
    }      OPTIONAL,-- Cond Setup
    ...
}
DRB-ToAddModList ::= SEQUENCE (SIZE (1..maxDRB)) OF DRB-ToAddMod
DRB-ToAddMod ::= SEQUENCE {
    eps-BearerIdentity      INTEGER (0..15)   OPTIONAL,-- Cond DRB-Setup
    drb-Identity       DRB-Identity,
    pdcp-Config   PDCP-Config     OPTIONAL, -- Cond PDCP
    rlc-ConfigRLC-Config         OPTIONAL, -- Cond Setup
    logicalChannelIdentity INTEGER (3..10)   OPTIONAL, -- Cond DRB-Setup
    logicalChannelConfig LogicalChannelConfig    OPTIONAL, -- Cond Setup
    ...
}
DRB-ToReleaseList ::= SEQUENCE (SIZE (1..maxDRB)) OF DRB-Identity
MeasSubframePatternPCell-r10 ::= CHOICE {
    release        NULL,
    setup          MeasSubframePattern-r10
}
PBCHpowerInfoPCell-r10 ::= SEQUENCE {
    deltaPower-e       ENUMERATED {dBZ3, dB0,..., dBZ4}
}
-- ASN1STOP
``` |

In this example, pbchpowerInfoPCell is merely a naming manner, and a physical meaning indicated by pbchpowerInfoPCell is a difference between power of the PBCH channel of the serving cell and power of the CRS of the serving cell. As described above in this specification, deltaPower-e is a specific value of the information element pbchpowerInfoPCell.

In a case in which the power ratio of the specific cell is unicast and the specific cell is an intra-frequency neighboring cell, a signaling example is:

Example 3

Among measurement information elements, a measurement object EUTRA information element is used as an example. When the power ratio between the PBCH and the CRS of the specific cell (the intra-frequency neighboring cell) and the physical cell identifier of the intra-frequency neighboring cell are unicast, a changed protocol is:

| MeasObjectEUTRA information element |
| --- |
| ```
-- ASN1START
MeasObjectEUTRA ::= SEQUENCE {
    carrierFreq                 ARFCN-ValueEUTRA,
    allowedMeasBandwidth        AllowedMeasBandwidth,
    presenceAntennaPort1        PresenceAntennaPort1,
    neighCellConfig             NeighCellConfig,
    offsetFreq    Q-OffsetRange          DEFAULT dB0,
    -- Cell list
    cellsToRemoveList    CellIndexList      OPTIONAL,-- Need ON
    cellsToAddModList    CellsToAddModList  OPTIONAL, -- Need ON
    -- Black list
    blackCellsToRemoveList   CellIndexList    OPTIONAL, -- Need ON
    blackCellsToAddModList   BlackCellsToAddModList
    OPTIONAL,   -- Need ON
    cellForWhichToReportCGI PhysCellId  OPTIONAL, -- Need ON
    ...,
    [[measCycleSCell-r10 MeasCycleSCell-r10 OPTIONAL,-- Need ON
        measSubframePatternConfigNeigh-r10
      MeasSubframePatternConfigNeigh-r10   OPTIONAL   Need ON
    ]]
        [[PBCHpowerInfoConfigNeigh-r10
      PBCHpowerInfoConfigNeigh-r10       OPTIONAL-- Need ON
        ]]
}
CellsToAddModList ::=  SEQUENCE  (SIZE    (1..maxCellMeas))   OF
CellsToAddMod
    CellsToAddMod ::= SEQUENCE {
        cellIndex        INTEGER (1..maxCellMeas),
        physCellId       PhysCellId,
        cellIndividualOffset   Q-OffsetRange
    }
BlackCellsToAddModList ::=   SEQUENCE (SIZE (1..maxCellMeas)) OF
BlackCellsToAddMod
BlackCellsToAddMod ::= SEQUENCE {
    cellIndex  INTEGER (1..maxCellMeas),
    physCellIdRange       PhysCellIdRange
}
MeasCycleSCell-r10 ::= ENUMERATED {sf160, sf256, sf320, sf512,
    sf640, sf1024, sf1280, spare1}
MeasSubframePatternConfigNeigh-r10 ::=CHOICE {
    release     NULL,
    setup       SEQUENCE {
        measSubframePatternNeigh-r10  MeasSubframePattern-r10,
    measSubframeCellList-r10
    MeasSubframeCellList-r10  OPTIONAL -- Cond measSubframe
    }
}
MeasSubframeCellList-r10 ::= SEQUENCE (SIZE (1..maxCellMeas))
OF PhysCellIdRange
PBCHpowerInfoConfigNeigh-r10 ::=CHOICE {
    release     NULL,
    setup            SEQUENCE {
       PBCHpowerInfoNeigh-r10          PBCHpowerInfo-r10,
       PBCHpowerInfoCellList-r10
    PBCHpowerInfoCellList-r10     OPTIONAL-- Cond PBCHpowerinfo
    }
}
PBCHpowerInfoCellList-r10 ::=    SEQUENCE (SIZE (1..maxCellMeas))
OF PhysCellIdRange
PBCHpowerInfo-r10 ::= SEQUENCE {
    p-e         ENUMERATED {dBZ1, dB0,..., dBZ2}
}
-- ASN1STOP
``` |

In this example, PBCHpowerInfoConfigNeigh is merely a naming manner, and a physical meaning indicated by PBCHpowerInfoConfigNeigh is a ratio between power of the PBCH channel of the specific intra-frequency neighboring cell and power of a CRS of a serving cell. As described above in this specification, p-e is a specific value of the information element pbchpowerinfo, and PBCHpowerInfoCellList is a PCI corresponding to the specific intra-frequency neighboring cell.

Example 4

Among measurement information elements, a measurement object EUTRA information element is used as an example. When the power difference between the PBCH and the CRS of the specific cell (the intra-frequency neighboring cell) and the physical cell identifier of the intra-frequency neighboring cell are unicast, a changed protocol is:

| MeasObjectEUTRA information element |
|---|
| ```
-- ASN1START
MeasObjectEUTRA ::= SEQUENCE {
    carrierFreq              ARFCN-ValueEUTRA,
    allowedMeasBandwidth     AllowedMeasBandwidth,
    presenceAntennaPort1     PresenceAntennaPort1,
    neighCellConfig          NeighCellConfig,
    offsetFreq    Q-OffsetRange     DEFAULT dB0,-- Cell list
    cellsToRemoveList CellIndexList       OPTIONAL,-- Need ON
    cellsToAddModList CellsToAddModList   OPTIONAL, -- Need ON
    -- Black list
    blackCellsToRemoveList   CellIndexList   OPTIONAL,-- Need ON
    blackCellsToAddModList   BlackCellsToAddModList OPTIONAL,--
Need ON
    cellForWhichToReportCGI PhysCellId OPTIONAL,-- Need ON
    ...,
    [[measCycleSCell-r10  MeasCycleSCell-r10 OPTIONAL,-- Need ON
       measSubframePatternConfigNeigh-r10
    MeasSubframePatternConfigNeigh-r10   OPTIONAL   Need ON
    ]]
       [[PBCHpowerInfoConfigNeigh-r10
       PBCHpowerInfoConfigNeigh-r10   OPTIONAL     -- Need ON
       ]]
}
CellsToAddModList ::=   SEQUENCE (SIZE (1..maxCellMeas)) OF
CellsToAddMod
CellsToAddMod ::= SEQUENCE {
    cellIndex                INTEGER (1..maxCellMeas),
    physCellId               PhysCellId,
    cellIndividualOffset         Q-OffsetRange
}
BlackCellsToAddModList ::=   SEQUENCE (SIZE (1..maxCellMeas)) OF
BlackCellsToAddMod
BlackCellsToAddMod ::= SEQUENCE {
    cellIndex                INTEGER (1..maxCellMeas),
    physCellIdRange              PhysCellIdRange
}
MeasCycleSCell-r10 ::= ENUMERATED {sf160, sf256, sf320, sf512,
                                sf640, sf1024, sf1280,
spare1}
MeasSubframePatternConfigNeigh-r10 ::=CHOICE {
    release              NULL,
    setup                SEQUENCE {
       measSubframePatternNeigh-r10
    MeasSubframePattern-r10,
       measSubframeCellList-r10
    MeasSubframeCellList-r10   OPTIONAL -- Cond measSubframe
    }
}
MeasSubframeCellList-r10 ::= SEQUENCE (SIZE (1..maxCellMeas))
OF PhysCellIdRange
PBCHpowerInfoConfigNeigh-r10 ::= CHOICE {
    release       NULL,
    setup         SEQUENCE {
       PBCHpowerInfoNeigh-r10        PBCHpowerInfo-r10,
       PBCHpowerInfoCellList-r10
PBCHpowerInfoCellList-r10   OPTIONAL-- Cond PBCHpowerinfo
    }
}
PBCHpowerInfoCellList-r10 ::= SEQUENCE (SIZE (1..maxCellMeas))
OF PhysCellIdRange
PBCHpowerInfo-r10 ::= SEQUENCE {
    deltaPower-e    ENUMERATED {dBZ3, dB0,..., dBZ4}
}
-- ASN1STOP
``` |

In this example, PBCHpowerInfoConfigNeigh is merely a naming manner, and a physical meaning indicated by PBCHpowerInfoConfigNeigh is a ratio between power of the PBCH channel of the specific intra-frequency neighboring cell and power of a CRS of a serving cell. As described above in this specification, deltaPower-e is a specific value of the information element pbchpowerinfo, and PBCHpowerInfoCellList is a PCI corresponding to the specific intra-frequency neighboring cell.

Example 5

Among radio resource control information elements, a radio resource configuration dedicated information element is used as an example. When the power ratio between the PBCH and the CRS of the specific cell (the intra-frequency neighboring cell) and the physical cell identifier of the intra-frequency neighboring cell are unicast, a changed protocol is:

| RadioResourceConfigDedicated information element |
|---|

```
-- ASN1START
RadioResourceConfigDedicated ::= SEQUENCE {
    srb-ToAddModList    SRB-ToAddModList    OPTIONAL,    -- Cond HO-Conn
    drb-ToAddModList    RB-ToAddModList    OPTIONAL,    -- Cond HO-toEUTRA
    drb-ToReleaseList    DRB-ToReleaseList    OPTIONAL,-- Need ON
    mac-MainConfig    CHOICE {
        explicitValue    MAC-MainConfig, defaultValue    NULL
    }    OPTIONAL,    -- Cond HO-toEUTRA2
    sps-Config    SPS-Config    OPTIONAL,    -- Need ON
    physicalConfigDedicated PhysicalConfigDedicated OPTIONAL, -- Need ON
    ...,
    [[ rlf-TimersAndConstants-r9
        RLF-TimersAndConstants-r9    OPTIONAL -- Need ON
    ]],
    [[ measSubframePatternPCell-r10
        MeasSubframePatternPCell-r10    OPTIONAL -- Need ON
    ]]
        [[PBCHpowerInfoConfigNeigh-r10
        PBCHpowerInfoConfigNeigh-r10    OPTIONAL --    Need ON
        ]]
}
RadioResourceConfigDedicatedSCell-r10 ::= SEQUENCE {
    -- UE specific configuration extensions applicable for an SCell
    physicalConfigDedicatedSCell-r10
    PhysicalConfigDedicatedSCell-r10    OPTIONAL,-- Need ON
    ...
}
SRB-ToAddModList ::=SEQUENCE (SIZE (1..2)) OF SRB-ToAddMod
SRB-ToAddMod ::= SEQUENCE {
    srb-Identity            INTEGER (1..2),
    rlc-Config            CHOICE {
        explicitValue        RLC-Config,
        defaultValue        NULL
    }    OPTIONAL,    -- Cond Setup
    logicalChannelConfig        CHOICE {
        explicitValue        LogicalChannelConfig,
        defaultValue        NULL
    }    OPTIONAL,    -- Cond Setup
    ...
}
DRB-ToAddModList ::= SEQUENCE (SIZE (1..maxDRB))
 OF DRB-ToAddMod
DRB-ToAddMod ::=    SEQUENCE {
    eps-BearerIdentity            INTEGER (0..15)
    OPTIONAL,    -- Cond DRB-Setup
    drb-Identity            DRB-Identity,
    pdcp-Config            PDCP-Config
    OPTIONAL,    -- Cond PDCP
    rlc-Config        RLC-Config    OPTIONAL,-- Cond Setup
    logicalChannelIdentity        INTEGER (3..10)
    OPTIONAL,    -- Cond DRB-Setup
    logicalChannelConfig        LogicalChannelConfig
    OPTIONAL,    -- Cond Setup
    ...
}
DRB-ToReleaseList ::= SEQUENCE (SIZE (1..maxDRB)) OF
DRB-Identity
MeasSubframePatternPCell-r10 ::=CHOICE {
    release        NULL,
    setup            MeasSubframePattern-r10
}
PBCHpowerInfoConfigNeigh-r10 ::=CHOICE {
    release            NULL,
    setup        SEQUENCE {
        PBCHpowerInfoNeigh-r10        PBCHpowerInfo-r10,
        PBCHpowerInfoCellList-r10
    PBCHpowerInfoCellList-r10    OPTIONAL-- Cond PBCHpowerInfo
    }
}
PBCHpowerInfoCellList-r10 ::=    SEQUENCE (SIZE (1..maxCellMeas))
OF PhysCellIdRange
```

| RadioResourceConfigDedicated information element |
|---|
| PBCHpowerInfo-r10 ::= SEQUENCE {<br>    p-e              ENUMERATED {dBZ3, dB0,..., dBZ4}<br>}<br>-- ASN1STOP |

Example 6

Among radio resource control information elements, a radio resource configuration dedicated information element is used as an example. When the power difference between the PBCH and the CRS of the specific cell (the intra-frequency neighboring cell) and the physical cell identifier of the intra-frequency neighboring cell are unicast, a changed protocol is:

| RadioResourceConfigDedicated information element |
|---|
| -- ASN1START<br>RadioResourceConfigDedicated ::=SEQUENCE {<br>    srb-ToAddModList           SRB-ToAddModList<br>    OPTIONAL,      -- Cond HO-Conn<br>    drb-ToAddModList           DRB-ToAddModList<br>    OPTIONAL,      -- Cond HO-toEUTRA<br>    drb-ToReleaseList          DRB-ToReleaseList<br>    OPTIONAL,      -- Need ON<br>    mac-MainConfig             CHOICE {<br>        explicitValue           MAC-MainConfig,<br>        defaultValue            NULL<br>    }     OPTIONAL,           - Cond HO-toEUTRA2<br>    sps-Config                 SPS-Config<br>    OPTIONAL,      -- Need ON<br>physicalConfigDedicated        PhysicalConfigDedicated<br>    OPTIONAL,      -- Need ON<br>    ...,<br>    [[  rlf-TimersAndConstants-r9<br>    RLF-TimersAndConstants-r9       OPTIONAL -- Need ON<br>    ]],<br>    [[ measSubframePatternPCell-r10<br>    MeasSubframePatternPCell-r10    OPTIONAL -- Need ON<br>    ]]<br>      [[PBCHpowerInfoConfigNeigh-r10<br>    PBCHpowerInfoConfigNeigh-r10     OPTIONAL  -- Need ON<br>      ]]<br>}<br>RadioResourceConfigDedicatedSCell-r10 ::=SEQUENCE {<br>    -- UE specific configuration extensions applicable<br>for an SCell physical Config Dedicated SCell-r10<br>   Physical Config Dedicated SCell-r10   OPTIONAL,<br>-- Need ON<br>    ...<br>}<br>SRB-ToAddModList ::=SEQUENCE (SIZE (1..2)) OF SRB-ToAddMod<br>SRB-ToAddMod ::=SEQUENCE {<br>    srb-Identity               INTEGER (1..2),<br>    rlc-Config                 CHOICE {<br>        explicitValue           RLC-Config,<br>        defaultValue            NULL<br>    }      OPTIONAL,          -- Cond Setup<br>    logicalChannelConfig          CHOICE {<br>        explicitValue           LogicalCharmelConfig,<br>        defaultValue            NULL<br>    }      OPTIONAL,<br>-- Cond Setup<br>      ...<br>    }<br>DRB-ToAddModList ::=SEQUENCE (SIZE (1..maxDRB)) OF DRB-ToAddMod<br>DRB-ToAddMod ::=SEQUENCE {<br>    eps-BearerIdentity           INTEGER (0..15)<br>    OPTIONAL,      -- Cond DRB-Setup<br>    drb-Identity               DRB-Identity,<br>    pdcp-Config                PDCP-Config<br>    OPTIONAL,      -- Cond PDCP<br>    rlc-Config         RLC-Config     OPTIONAL,- Cond Setup |

| RadioResourceConfigDedicated information element |
| --- |
| logicalChannelIdentity         INTEGER (3..10)<br>OPTIONAL,    -- Cond DRB-Setup<br>logicalChannelConfig         LogicalChannelConfig<br>OPTIONAL,    -- Cond Setup<br>  ...<br>}<br>DRB-ToReleaseList ::=SEQUENCE (SIZE (1..maxDRB)) OF<br>DRB-Identity<br>MeasSubframePatternPCell-r10 ::=CHOICE {<br>    release         NULL,<br>    setup          Meas SubframePattern-r10<br>}<br>PBCHpowerInfoConfigNeigh-r10 ::=CHOICE {<br>    release         NULL,<br>    setup          SEQUENCE {<br>      PBCHpowerInfoNeigh-r10     PBCHpowerInfo-r10,<br>      PBCHpowerInfoCellList-r10<br>      PBCHpowerInfoCellList-r10    OPTIONAL -- Cond PBCHpowerInfo<br>    }<br>}<br>PBCHpowerInfoCellList-r10 ::=    SEQUENCE (SIZE (1..maxCellMeas))<br>OF PhysCellIdRange<br>PBCHpowerInfo-r10 ::= SEQUENCE {<br>    deltaPower-e        ENUMERATED {dBZ3, dB0,..., dBZ4}<br>}<br>-- ASN1STOP |

Step 903: The user terminal (the user 1) attempts to read MIB information of the pico cell (the base station 2) and perform channel estimation, channel reconstruction, and interference cancellation.

A process of the channel estimation, channel reconstruction, and interference cancellation is: obtaining downlink cell-specific power ratio information of a specific cell, where the specific cell is a neighboring cell or a serving cell; performing channel estimation based on a downlink cell-specific reference signal CRS of the specific cell, to obtain a channel estimation matrix of a specific physical channel, signal, or message of the specific cell; compensating the channel estimation matrix by using the downlink cell-specific power ratio information of the specific cell, to obtain a new channel estimation matrix; reconstructing a received signal from the specific physical channel, signal, or message of the specific cell according to the new channel estimation matrix; and canceling, in an original signal received from a target cell, interference caused by the intra-frequency specific cell, which is not the target cell, in a received signal from a specific physical channel, signal, or message, where the target cell is a serving cell or a neighboring cell. For details about a specific implementation process, refer to the foregoing embodiment, which is not described herein again.

Embodiment 6

This embodiment provides another HetNet inter-cell interference cancellation scenario. Still using FIG. 5 as an example, it is assumed that a user terminal is moving from a macro cell (a base station 1) to a pico cell (a base station 2). At this time, the macro cell is a serving cell of the user terminal. Before being handed over to the pico cell, the user terminal obtains a power ratio or a power difference between a PBCH and a CRS of the original serving cell (the macro cell) by using RRC signaling of the original serving cell, and stores the parameter in the user terminal. After being handed over to the pico cell and when reading an MIB message of the pico cell, the user terminal performs a process of channel estimation, channel reconstruction, and interference cancellation for the interfering cell by using the previously stored power ratio or power difference between the PBCH and the CRS. In this embodiment, the specific physical channel PBCH is used as an example, but content of the present invention is applicable to other specific physical channels besides the PBCH, specific messages, and specific signals.

In the embodiment of the present invention, a power difference factor or a power ratio factor between a specific physical channel, signal, or message and a reference signal CRS is broadcast in a broadcast message, so that an edge UE subject to strong interference can effectively estimate a strong interfering signal and effectively cancel the strong interference according to an interference cancellation algorithm designed in the method, thereby improving interference cancellation performance of a user terminal.

That is, in the embodiments of the present invention, an interference cancellation method in an LTE system is designed for a future mobile communications system in which a large number of LPNs are introduced. The method may be defined as a network-assisted interference cancellation algorithm in nature. That is, by means of a sending power difference factor or a sending power ratio factor, which is broadcast by a network node, of a physical channel, signal, or message, sending power of the specific physical channel, signal, or message of an interfering cell is obtained, so that in a case in which large CRE is introduced, a user terminal can better estimate a strong interfering signal of the interfering cell and implement interference cancellation on the specific physical channel, signal, or message of the interfering cell, thereby further improving performance of an interference cancellation algorithm, ensuring QoS for an edge user in a HetNet scenario, and improving network performance.

It should be noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or a device that includes a list of elements not only includes those elements, but also includes other elements that are not expressly listed, or further includes elements inherent to such a process, method, article, or device. An element preceded by "includes a . . . " does not, without more constraints, preclude the presence of additional identical elements in the process, method, article, or device that includes the element.

Based on the foregoing descriptions of the embodiments, a person skilled in the art may clearly understand that the present invention may be implemented by software in addition to a necessary universal hardware platform or by hardware only. In most circumstances, the former is a preferred implementation manner. Based on such an understanding, the technical solutions of the present invention essentially or the part contributing to the prior art may be implemented in a form of a software product. The software product may be stored in a storage medium, such as a ROM/RAM, a magnetic disk, or an optical disc, and includes several instructions for instructing a computer device (which may be a personal computer, a server, or a network device) to perform the methods described in the embodiments or some parts of the embodiments of the present invention.

The foregoing descriptions are merely exemplary implementation manners of the present invention. It should be noted that a person of ordinary skill in the art may make certain improvements or polishing without departing from the principle of the present invention and the improvements or polishing shall fall within the protection scope of the present invention.

What is claimed is:

1. An interference cancellation method in a Long Term Evolution system, the method comprising:
    obtaining downlink cell-specific power information of a specific cell, wherein the specific cell is a neighboring cell or a serving cell;
    performing channel estimation based on a downlink cell-specific reference signal (CRS) of the specific cell, to obtain a channel estimation matrix of a specific physical channel, signal, or message of the specific cell;
    compensating the channel estimation matrix by using the downlink cell-specific power information of the specific cell, to obtain a new channel estimation matrix;
    reconstructing a received signal from the specific physical channel, signal, or message of the specific cell according to the new channel estimation matrix; and
    canceling, in an original signal received from a target cell, interference caused by the specific cell, which is not the target cell, in a received signal from a specific physical channel, signal, or message, wherein the target cell is a serving cell or a neighboring cell.

2. The method according to claim 1, wherein the downlink cell-specific power information comprises:
    a power ratio factor or a power difference factor between transmit power of the specific physical channel, signal, or message and transmit power of the CRS; or
    a power ratio factor or a power difference factor between transmit power of the CRS and transmit power of the specific physical channel, signal, or message.

3. The method according to claim 1, wherein:
    the specific physical channel comprises: a physical control format indicator channel (PCFICH), a physical downlink control channel (PDCCH), a physical broadcast channel (PBCH), or a paging channel (PCH);
    the specific message comprises: a system information block (SIB) message; and
    the specific signal comprises: a primary synchronization signal (PSS) or a secondary synchronization signal (SSS).

4. The method according to claim 1, wherein obtaining downlink cell-specific power information of a specific cell comprises:
    receiving the downlink cell-specific power information of the specific cell, which is unicast on a network side by using a radio resource control (RRC) message; or
    receiving the downlink cell-specific power information of the specific cell and a physical cell identifier of the specific cell, which are unicast on a network side by using an RRC message; or
    receiving the downlink cell-specific power information of the specific cell, or the downlink cell-specific power information and a physical cell identifier of the specific cell, broadcast on a network side by using a physical broadcast channel (PBCH); or
    receiving a system information block (SIB) message broadcast on a network side, wherein the SIB message comprises: the downlink cell-specific power information of the specific cell, or the downlink cell-specific power information and a physical cell identifier of the specific cell.

5. The method according to claim 1, wherein the specific cell is an intra-frequency neighboring cell.

6. The method according to claim 5, wherein the downlink cell-specific power information comprises:
    a power ratio factor or a power difference factor between transmit power of the specific physical channel, signal, or message and transmit power of the CRS; or
    a power ratio factor or a power difference factor between transmit power of the CRS and transmit power of the specific physical channel, signal, or message.

7. The method according to claim 5, wherein:
    the specific physical channel comprises: a physical control format indicator channel (PCFICH), a physical downlink control channel (PDCCH), a physical broadcast channel (PBCH), or a paging channel (PCH);
    the specific message comprises: a system information block (SIB) message; and
    the specific signal comprises: a primary synchronization signal (PSS) or a secondary synchronization signal (SSS).

8. An interference cancellation apparatus in a Long Term Evolution system, the apparatus comprising:
    a non-transitory computer-readable medium configured for storing processor-executable instructions; and
    at least one processor configured to execute the processor-executable instructions to:
    obtain downlink cell-specific power information of a specific cell, wherein the specific cell comprises a neighboring cell or a serving cell;
    perform channel estimation based on a downlink cell-specific reference signal (CRS) of the specific cell, to obtain a channel estimation matrix of a specific physical channel, signal, or message of the specific cell;
    compensate the channel estimation matrix by using the downlink cell-specific power information of the specific cell, to obtain a new channel estimation matrix;
    reconstruct a received signal from the specific physical channel, signal, or message of the specific cell according to the new channel estimation matrix; and
    cancel, in an original signal received from a target cell, interference caused by the specific cell, which is not the target cell, in a received signal from a specific physical channel, signal, or message, wherein the target cell comprises a serving cell or a neighboring cell.

9. The apparatus according to claim 8, wherein the downlink cell-specific power information comprises:
a power ratio factor or a power difference factor between transmit power of the specific physical channel, signal, or message and transmit power of the CRS; or
a power ratio factor or a power difference factor between transmit power of the CRS and transmit power of the specific physical channel, signal, or message.

10. The apparatus according to claim 8, wherein the at least one processor is further configured to execute the processor-executable instructions to:
receive the downlink cell-specific power information of the specific cell, which is unicast on a network side by using a radio resource (RRC) message; or
receive the downlink cell-specific power information of the specific cell and a physical cell identifier of the specific cell, which are unicast on a network side by using an RRC message; or
receive the downlink cell-specific power information of the specific cell, or the downlink cell-specific power information and a physical cell identifier of the specific cell, broadcast on a network side by using a physical broadcast channel (PBCH); or
receive a system information block (SIB) message broadcast on a network side, wherein the SIB message comprises: the downlink cell-specific power information of the specific cell, or the downlink cell-specific power information and a physical cell identifier of the specific cell.

11. The apparatus according to claim 8, wherein the specific cell is an intra-frequency neighboring cell.

12. The apparatus according to claim 11, wherein the downlink cell-specific power information comprises:
a power ratio factor or a power difference factor between transmit power of the specific physical channel, signal, or message and transmit power of the CRS; or
a power ratio factor or a power difference factor between transmit power of the CRS and transmit power of the specific physical channel, signal, or message.

13. The apparatus according to claim 11, wherein the at least one processor is further configured to execute the processor-executable instructions to:
receive the downlink cell-specific power information of the specific cell, which is unicast on a network side by using a radio resource control (RRC) message; or
receive the downlink cell-specific power information of the specific cell and a physical cell identifier of the specific cell, which are unicast on a network side by using an RRC message; or
receive the downlink cell-specific power information of the specific cell, or the downlink cell-specific power information and a physical cell identifier of the specific cell, broadcast on a network side by using a physical broadcast channel (PBCH); or
receive a system information block (SIB) message broadcast on a network side, wherein the SIB message comprises: the downlink cell-specific power information of the specific cell, or the downlink cell-specific power information and a physical cell identifier of the specific cell.

14. A data sending apparatus in a Long Term Evolution system, the apparatus comprising:
a non-transitory computer-readable medium configured for storing processor-executable instructions; and
at least one processor configured to execute the processor-executable instructions to:
obtain downlink cell-specific power information of a specific cell;
add the downlink cell-specific power information of the specific cell to a radio resource control (RRC) message or a broadcast message; and
unicast the RRC message or broadcast the broadcast message to a user terminal, so that the user terminal that receives the RRC message or the broadcast message performs interference cancellation by compensating a channel estimation matrix using the downlink cell-specific power information of the specific cell to obtain a new channel estimation matrix and reconstructing a received signal of the specific cell according to the new channel estimation matrix.

15. The apparatus according to claim 14, wherein the at least one processor is further configured to execute the processor-executable instructions to:
unicast the downlink cell-specific power information of the specific cell by using a radio resource control information element in the RRC message; or
unicast the downlink cell-specific power information of the specific cell and a physical cell identifier of the specific cell by using a radio resource control information element or a measurement information element in the RRC message; or
broadcast the downlink cell-specific power information and the physical cell identifier of the specific cell to the user terminal by using a system master information block (MIB) carried on a physical broadcast channel (PBCH); or
broadcast the downlink cell-specific power information and the physical cell identifier of the specific cell to the user terminal by using a system information block (SIB) message.

16. The apparatus according to claim 14 wherein the downlink cell-specific power information comprises:
a power ratio factor or a power difference factor between transmit power of a specific physical channel, signal, or message and transmit power of a reference signal (CRS); or
a power ratio factor or a power difference factor between transmit power of a reference signal (CRS) and transmit power of a specific physical channel, signal, or message.

17. The apparatus according to claim 14, wherein the at least one processor is further configured to execute the processor-executable instructions to:
obtain downlink cell-specific power information of a specific cell of an opposite party or obtain downlink cell-specific power information and a physical cell identifier of a specific cell of the opposite party by using a logical interface between the specific cell and a serving cell; or
obtain the downlink cell-specific power information and the physical cell identifier of the specific cell by using load information; or
obtain the downlink cell-specific power information and the physical cell identifier of the specific cell by using load information transmitted by a logical interface.

18. The apparatus according to claim 14, wherein the specific cell is an intra-frequency neighboring cell.

19. The apparatus according to claim 18, wherein the downlink cell-specific power information comprises:

a power ratio factor or a power difference factor between transmit power of a specific physical channel, signal, or message and transmit power of a reference signal (CRS); or a power ratio factor or a power difference factor between transmit power of a reference signal (CRS) and transmit power of a specific physical channel, signal, or message.

20. The apparatus according to claim 16, wherein the at least one processor is further configured to execute the processor-executable instructions to:

obtain downlink cell-specific power information of a specific cell of an opposite party or obtain downlink cell-specific power information and a physical cell identifier of a specific cell of the opposite party by using a logical interface between the specific cell and a serving cell; or obtain the downlink cell-specific power information and the physical cell identifier of the specific cell by using load information; or obtain the downlink cell-specific power information and the physical cell identifier of the specific cell by using load information transmitted by a logical interface.

* * * * *